(12) United States Patent
Kishimoto

(10) Patent No.: US 11,052,732 B2
(45) Date of Patent: Jul. 6, 2021

(54) SHADING DEVICE FOR VEHICLE

(71) Applicant: Sakai Display Products Corporation, Osaka (JP)

(72) Inventor: Katsuhiko Kishimoto, Osaka (JP)

(73) Assignee: Sakai Display Products Corporation, Osaka (JP)

(*) Notice: Subject to any disclaimer, the term of this patent is extended or adjusted under 35 U.S.C. 154(b) by 24 days.

(21) Appl. No.: 16/715,981

(22) Filed: Dec. 16, 2019

(65) Prior Publication Data

US 2020/0114736 A1 Apr. 16, 2020

Related U.S. Application Data

(63) Continuation of application No. 15/771,389, filed as application No. PCT/JP2017/015386 on Apr. 14, 2017, now Pat. No. 10,562,378.

(51) Int. Cl.
*B60J 3/04* (2006.01)
*B60R 1/00* (2006.01)
(Continued)

(52) U.S. Cl.
CPC . *B60J 3/04* (2013.01); *B60J 3/00* (2013.01); *B60R 1/00* (2013.01); *G02F 1/13* (2013.01); *G02F 1/1313* (2013.01)

(58) Field of Classification Search
CPC ....... B60J 3/04; B60J 3/00; G02F 1/13; G02F 1/1313; B60R 1/00; B60R 2300/202; B60R 2011/0035; B60R 2011/0022; B60R 11/04

(Continued)

(56) References Cited

U.S. PATENT DOCUMENTS 8,842,176 B2 * 9/2014 Schofield ................. H04N 7/18
348/113
9,290,082 B1 3/2016 Smith
(Continued)

FOREIGN PATENT DOCUMENTS

JP H0559875 A 3/1993
JP H06297947 A 10/1994
(Continued)

OTHER PUBLICATIONS

PCT International Search Report, PCT Application No. PCT/JP2017/015386, Japan Patent Office. dated May 23, 2017.
(Continued)

*Primary Examiner* — Pinel E Romain
(74) *Attorney, Agent, or Firm* — Snell & Wilmer L.L.P.

(57) ABSTRACT

A shading device for a vehicle, comprising a dimming glass plate capable of changing a light transmittance thereof, wherein the dimming glass plate is provided at a portion of a vehicular window glass to separate an interior of vehicular compartment from outside of the vehicular compartment or provided at a portion of a surface of the vehicular window glass that faces inside of the vehicular compartment; a display apparatus formed of a light transmitting material and disposed at a surface of the dimming glass plate that faces inside of the vehicular compartment, with a display portion facing inside the vehicular compartment; an image pickup device to capture an area outside of a vehicle to generate image pickup data, wherein the area is at an opposite surface on the dimming glass plate, the opposite surface being (Continued)

opposite a surface on which the display apparatus is provided; a data processing circuit to generate display image data to be displayed on the display portion based on the image pickup data generated by the image pickup device; and a switch to change light transmittance of the dimming glass plate.

13 Claims, 16 Drawing Sheets

(51) Int. Cl.
   *G02F 1/13* (2006.01)
   *B60J 3/00* (2006.01)
(58) Field of Classification Search
   USPC .................................................... 296/97.2
   See application file for complete search history.

(56) References Cited

U.S. PATENT DOCUMENTS

| | | | |
|---|---|---|---|
| 9,759,916 B2* | 9/2017 | Beckman | ........... G02B 27/0101 |
| 2006/0062570 A1 | 3/2006 | Kikuchi et al. | |
| 2006/0175859 A1* | 8/2006 | Isaac | .......................... B60J 3/04 |
| | | | 296/97.4 |
| 2010/0276962 A1* | 11/2010 | Zhang | ........................ B60J 3/00 |
| | | | 296/97.2 |
| 2015/0097389 A1* | 4/2015 | Dryselius | ............. G02F 1/13306 |
| | | | 296/96.19 |

FOREIGN PATENT DOCUMENTS

| | | |
|---|---|---|
| JP | H0717238 A | 1/1995 |
| JP | 2002202486 A | 7/2002 |
| JP | 2005122981 A | 5/2005 |
| JP | 2006091249 A | 4/2006 |
| JP | 2009006893 A | 1/2009 |
| JP | 2009227018 A | 10/2009 |
| WO | 2017022172 A1 | 2/2017 |

OTHER PUBLICATIONS

English Translation of PCT International Search Report, PCT Application No. PCT/JP2017/015386, Japan Patent Office. dated May 23, 2017.
English Translation of the International Preliminary Report on Patentability, PCT Application No. PCT/JP2017/015386, dated Oct. 24, 2019.

* cited by examiner

SHADING DEVICE FOR VEHICLE

CROSS-REFERENCE TO RELATED APPLICATIONS

This patent application is a continuation of co-pending U.S. patent application Ser. No. 15/771,389, having a filing/§ 371(c) date of Apr. 24, 2019, which is a U.S. National Stage of International Application No. PCT/JP2017/015386, filed on Apr. 14, 2017 (expired).

TECHNICAL FIELD

The present invention relates to a shading device for a vehicle.

BACKGROUND ART

When being in a vehicle such as a car, and sunlight directly comes into sight of a vehicular driver or other occupants, the glare of light can make it difficult to look squarely out the window or the occurrence of glare can make it difficult to ensure normal visibility. In such a case, for shielding sunlight, the vehicular driver disposes a shading member provided in the vehicle compartment to a position close to a windshield. For example, Patent Document 1 discloses a shading device with a liquid crystal display, wherein, when used for shading, the shading device can change the contrast of the liquid crystal display in accordance with an amount of external light and, when not used for shading, it can display letters or the like on the liquid crystal display by way of ornament.

PRIOR ART DOCUMENT

Patent Document

Patent Document 1: JP H5-59875 A

SUMMARY OF THE INVENTION

Problems to be Solved by the Invention

A shading device can be used for reducing the glare by sunlight. On the other hand, however, using the shading device, which covers a part of a windshield, can create blind spots in the field of vision of the vehicular driver or other occupants. Especially, when such shading device is positioned at a vehicular driver seat, traffic lights or a road sign positioned above vehicular driver's line of vision do not necessarily come into sight of the vehicular driver, and the vehicular driver can miss the traffic lights or a road sign. Also, the shading device is positioned where it does not cause such blind spots while not in use and is positioned, only when necessary, in another position where it covers a part of a windshield. The vehicular driver needs to move the shading device every time he/she uses the shading device. In addition, depending on the angle of the sunlight and the vehicular driver's posture, the shading device can be positioned in a position relatively close to the vehicular driver. In such a case, even when the shading device is provided with a liquid crystal display as disclosed in Patent Document 1, it can be difficult for the vehicular driver to see a display image on the liquid crystal display.

Accordingly, an object of the present invention is to provide a shading device for a vehicle that is capable of obstructing sunlight only when necessary without being moved and, while obstructing sunlight, displaying an image of a view obstructed by the shading device.

Means to Solve the Problem

A shading device for a vehicle according to one embodiment of the present invention comprises a dimming glass plate capable of changing a light transmittance thereof, wherein the dimming glass plate is provided at a portion of a vehicular window glass to separate an interior of a vehicular compartment from outside of the vehicular compartment or provided at a portion of a surface of the vehicular window glass that faces inside of the vehicular compartment; a display apparatus formed of a light transmitting material and disposed at a surface of the dimming glass plate that faces inside of the vehicular compartment, with a display portion facing inside of the vehicular compartment; an image pickup device to capture an area outside of a vehicle to generate image pickup data, wherein the area is at an opposite surface on the dimming glass plate, the opposite surface being opposite a surface on which the display apparatus is provided; a data processing circuit to generate display image data to be displayed on the display portion based on the image pickup data generated by the image pickup device; and a switch to change light transmittance of the dimming glass plate.

Effect of the Invention

According to the present invention, the shading device is capable of obstructing sunlight only when necessary without being moved and, while obstructing sunlight, displaying an image of the view obstructed by the shading device.

EMBODIMENT FOR CARRYING OUT THE INVENTION

Next, embodiments of the shading device (hereinafter, a "shading device for a vehicle" is simply referred to as a "shading device" as well) of the present invention will be described with reference to the drawings. Materials and, shapes of, and relative position relationships among components, or the like in the embodiments described below are merely illustrative. The shading device of the present invention is not construed to be limitative thereto. In addition, the shading device according to Embodiment 1 will be described next with reference to figures showing a typical car, as a shading device for a car that is provided at a portion of a windshield by way of example. However, the shading device of the present invention can be used not only in cars of the types as shown therein but also in a variety of vehicles such as buses, trucks, and trains.

<Embodiment 1>

Figure 1:
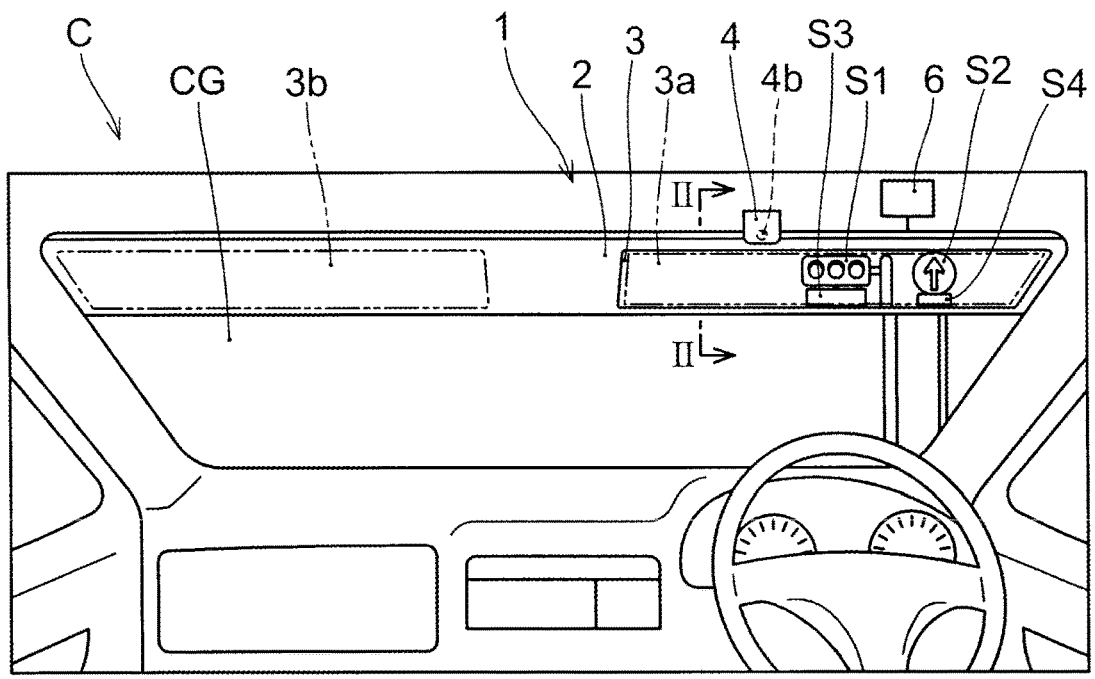
FIG. 1 shows a shading device for a vehicle according to Embodiment 1.
Figure 2:
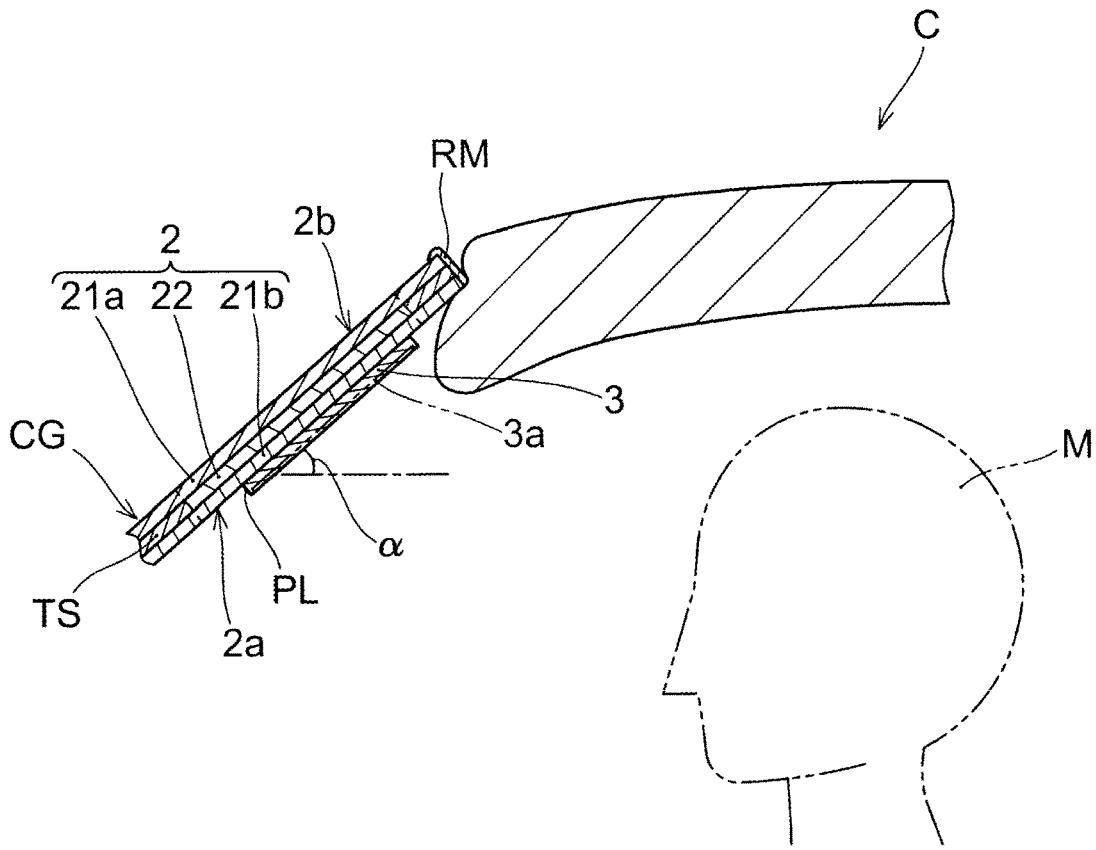
FIG. 2 shows a cross-sectional view along a line II-II of FIG. 1.
Figure 3A:
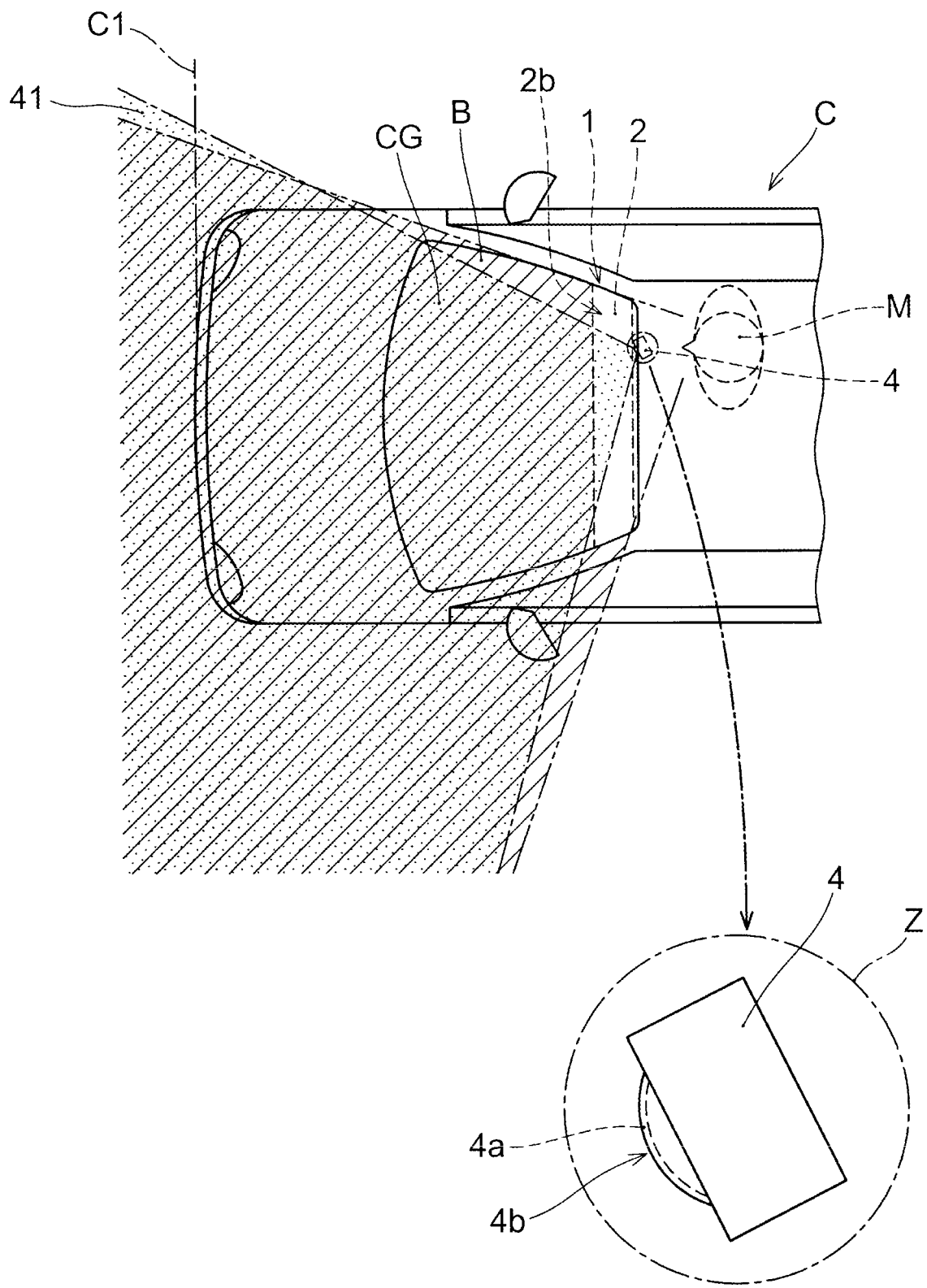
FIG. 3A schematically shows one example of an area to be captured by an image pickup device of the shading device for the vehicle according to Embodiment 1 along with a blind spot portion.
Figure 3B:
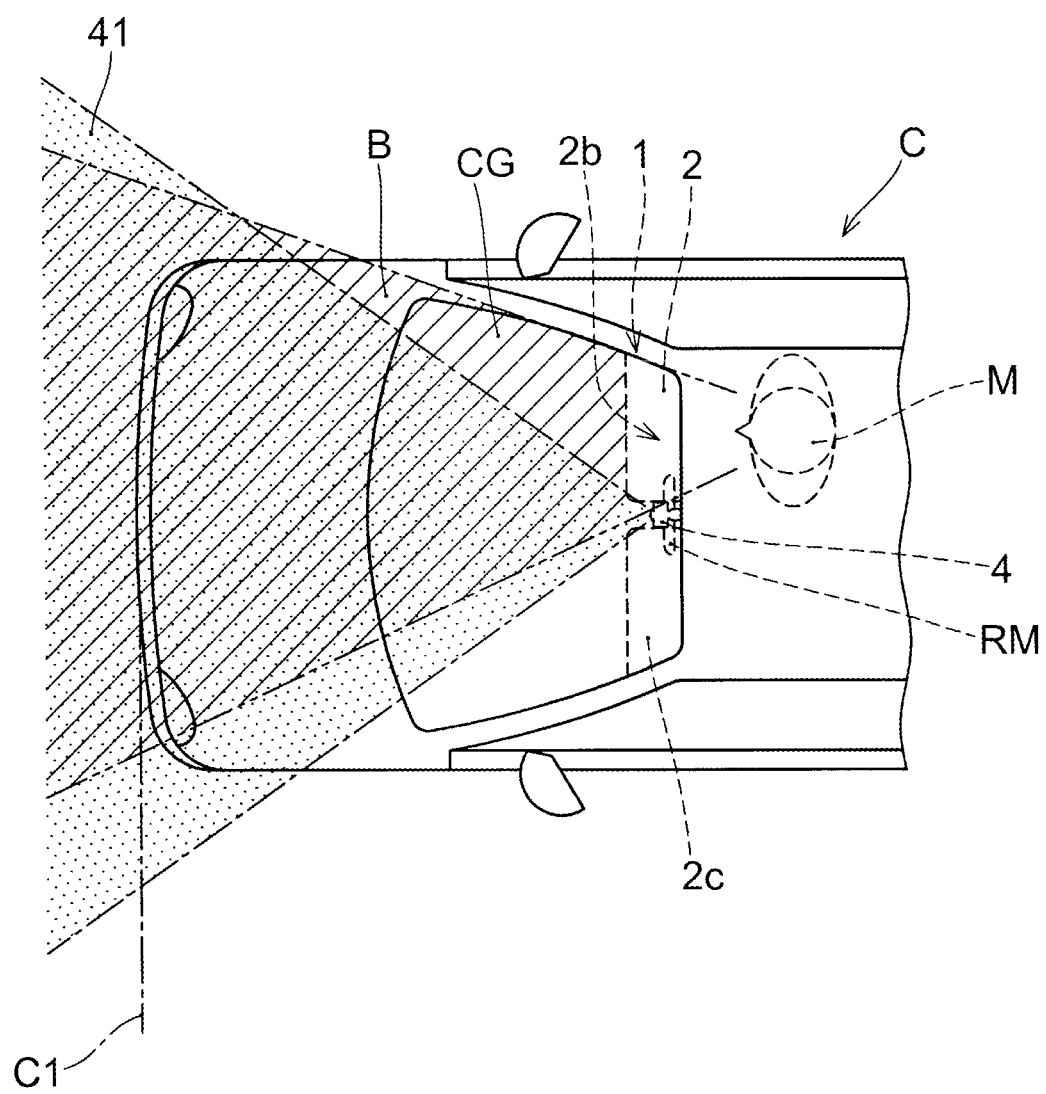
FIG. 3B shows another example of an area to be captured by the image pickup device of the shading device for the vehicle according to Embodiment 1 along with the blind spot portion.

FIG. 1 shows a windshield CG and the surroundings thereof viewed from the interior of the vehicle compartment of a car C, with a shading device 1 according to Embodiment 1 that is provided at a portion of the windshield CG. FIG. 2 shows an enlarged cross-sectional view along a line II-II of FIG. 1. Also, FIG. 3A and FIG. 3B schematically show an image pickup area 41 to be captured by an image pickup device 4 of the shading device 1.

As shown in FIGS. 1 to 3B, the shading device 1 for the vehicle according to the present embodiment comprises: a dimming glass plate 2 capable of changing its light transmittance and provided at a portion of a vehicular window glass; and a display apparatus 3 disposed on a surface 2a of the dimming glass plate 2 which faces the interior of the vehicle. The dimming glass plate 2 is provided at a portion of the windshield CG of the car C in the examples of FIGS. 1 to 3B. The display apparatus 3 is made of a light transmitting material. The display apparatus 3 is disposed on the surface 2a of the dimming glass plate 2, with a display portion 3a facing the interior of the vehicle. The shading device 1 further comprises the image pickup device 4 to capture an area outside of the car to generate image data. The area is at a surface 2b of the dimming glass plate 2, which is opposite the surface 2a on which the display apparatus 3 is provided. In the following description, the "surface 2a" of the dimming glass plate 2 is also referred to as a "first surface 2a" of the dimming glass plate 2. In addition, the surface 2b opposite the surface 2a is also referred to as a "second surface 2b" of the dimming glass plate 2. The shading device 1 further comprises: a data processing circuit 5 (see FIG. 9) generating display image data to be displayed on the display portion 3a of the display apparatus 3 based on the image pickup data generated by the image pickup device 4; and a switch 6 changing light transmittance of the dimming glass plate 2. The image pickup device 4 and the data processing circuit 5 (that are not shown) are connected in a wired or wireless manner so that data transmission and reception are possible therebetween. In the FIG. 1, the switch 6 is conceptually shown as a rectangular functional block.

In the present embodiment, the dimming glass plate 2 is provided to separate the interior of the vehicle compartment from the exterior of the vehicular compartment, forming a portion of the windshield CG of the car C. The dimming glass plate 2 can be provided at a portion of a surface of the vehicular window glass facing the interior of the vehicular compartment. Such aspect will be described later as Embodiment 2. The dimming glass plate 2 can allow light to pass therethrough or obstruct light in accordance with the change in its light transmittance. The dimming glass plate 2 is provided at an upper edge portion of the windshield CG. In the example of FIG. 1, the dimming glass plate 2 is provided over the entire length of the upper edge portion of the windshield CG in the vehicle width direction.

The dimming glass plate 2 is provided to extend up to the upper edge of an opening for the windshield CG in the front surface of the vehicular compartment (this opening does not include an adhesive application portion for adhering the car body and the windshield CG). As shown in FIG. 1, however, a gap can be present between the upper edge of the windshield CG and the dimming glass plate 2. As shown in FIG. 2, at a portion near the upper edge of the windshield CG, the interior of a ceiling portion of the vehicular compartment inwardly projects to overlap the windshield CG in the interior of the vehicle. Owing to this projected portion in the interior, without causing particular problems, the gap can be allowed to be present at a portion near the upper edge of the windshield CG that obstructs sunlight hitting the vehicular driver and an occupant in the passenger's seat. In the example of FIG. 1, the image pickup device 4 is disposed in the interior of the vehicular compartment so that a lens 4b is positioned between the upper edge of the windshield CG and the dimming glass plate 2. The image pickup device 4 can capture a view outside the vehicular compartment even when the dimming glass plate 2 is in an obstructing state. In FIG. 2, a sign RM represents resin mold.

The dimming glass plate 2, unlike the example of FIG. 1, can be provided only at a portion in front of the vehicular driver's seat, which takes up about half the portion on the vehicular driver's seat side in the vehicle width direction. Also, spaced apart from the dimming glass plate (a first dimming glass plate) provided in the above manner, a second dimming glass plate can be provided at a portion in front of a passenger's seat which takes up about half the portion on the passenger's seat side. In the present embodiment, the dimming glass plate 2 has a generally rectangular shape (in FIG. 1, where the windshield CG is inclined, the left and right edges are not shown to be parallel to each other). However, the dimming glass plate 2 can be formed in any shape other than a rectangle, such as a trapezoid or an ellipse. The position, size, and shape of the dimming glass plate 2 are not construed to be limited to those shown in FIG. 1 as long as it can obstruct sunlight when needed.

The dimming glass plate 2 includes: two glass plates 21a, 21b provided to oppose each other; and a liquid crystal sheet 22 disposed between the glass plates 21a and 21b. As described later, the dimming glass plate 2 changes its light transmittance based on the magnitude of a voltage applied to the liquid crystal sheet 22. The voltage applied to the liquid crystal sheet 22 is changed by the switch 6.

The switch 6 is an electrical switch that is connected at a portion between power supply unit (not shown, such as a battery, an alternator or a voltage regulator that generates a stabilized voltage upon receipt of battery power or the like) of the vehicle and the dimming glass plate 2. In this case, the switch 6 switches between two states: a state in which a given voltage is applied to the dimming glass plate 2 and a state in which the given voltage is not applied. The switch 6 can also be one used to change a reference voltage to be a reference for an output voltage of a voltage regulator, which is not shown, to change the voltage applied to the dimming glass plate 2 connected to an output of the voltage regulator. For example, the switch 6 can be a variable resistor or the like, which is connected between a power supply unit and a grounding line, with an intermediate terminal connected to a reference voltage input terminal of the voltage regulator. In this case, the switch 6 can change the light transmittance of the dimming glass plate 2 in a stepwise or continuous manner. In the switch 6, any switching element capable of switching whether a voltage is applied to the dimming glass plate 2 or capable of changing a magnitude of the applied voltage to the dimming glass plate 2 is used. The switch 6 can be manually operated or, as described later, can be operated by any other components of the shading device 1 according to the present Embodiment 1.

In the example of FIG. 1, the display apparatus 3 is provided only at a portion in front of the vehicular driver's seat in the vehicle width direction. However, like the dimming glass plate 2 shown in FIG. 1, the display apparatus 3 can be provided over almost the entire length in the vehicle width direction. Also, in addition to the display apparatus 3 in front of the vehicular driver's seat, a second display apparatus 3b can be provided at a portion in front of the passenger's seat, separated from the display apparatus 3. When the display apparatus 3 is provided over almost the entire length in the vehicle width direction, or the second display apparatus 3b is provided in front of the passenger's seat, the portion of the display apparatus 3 in front of the passenger's seat or the second display apparatus 3b can display an image based on the view seen from a vehicular driver M or an image based on the view seen from a passenger in the passenger's seat. The image to be displayed on the portion of the display apparatus 3 in front of the passenger's seat or the second display apparatus 3b can be switched by operation of a switching means such as a transfer switch based on, for example, the state of the passenger's seat (e.g., whether the passenger is present in the passenger's seat). For example, if the car C is provided with a seat belt usage detection device for the passenger's seat, based on the detection result of the detection device, the image to be displayed on the portion of the display apparatus 3 in front of the passenger's seat or the second display apparatus 3b can be switched. For example, while the seat belt of the passenger's seat is being fastened, an image based on the view seen from the passenger in the passenger's seat can be displayed on the portion of the display apparatus 3 in front of the passenger's seat or the second display apparatus 3b. When the view seen from the passenger in the passenger's seat is displayed, a second image pickup device for the passenger's seat and, as will be described later, a detector detecting positions of the eyes of the occupant in the passenger's seat can be provided.

Also, when the display apparatus 3 is provided over almost the entire length in the vehicle width direction, or the second display apparatus 3b is provided in front of the passenger's seat, the angle formed by a display surface of the display apparatus 3 or the second display apparatus 3b further away from the vehicular driver's seat and a line of view of the vehicular driver M can be an acute angle. In order to maintain visibility from the vehicular driver M even in such a situation, the image pickup data can be processed, as will be described in the following.

As described previously, the display apparatus 3 is formed of a light transmitting material. Therefore, when the dimming glass plate 2 is set to be in a light transmitting state by the switch 6, an occupant in the vehicular compartment, such as the vehicular driver M, can see outside the vehicle through the display apparatus 3 and the dimming glass plate 2 even at a portion where the dimming glass plate 2 is provided.

For sunlight illuminating the vehicular compartment, on the other hand, the switch 6 is used to lower the light transmittance of the dimming glass plate 2 so that the sunlight can be obstructed. Also, based on image pickup data generated by the image pickup device 4, an image of a scene external to the vehicle that the second surface 2b of the dimming glass plate 2 faces can be displayed on the display portion 3a of the display apparatus 3. The display portion 3a of the display apparatus 3 is the portion (the display surface) where an image is displayed. In the present embodiment, almost the entire surface of the display apparatus 3 that faces the vehicular compartment is the display portion 3a. In FIG. 1 and FIG. 2, for better understanding, the display portion 3a is shown in a chain double-dashed line along the periphery of the display apparatus 3 and the surface of the display apparatus 3 that faces the vehicular compartment (the display portion 3a is omitted in figures other than FIG. 1 and FIG. 2). The display apparatus 3 can have a bezel portion on its periphery.

FIG. 1 shows the display apparatus 3 displaying images, wherein the display apparatus 3 displays images of traffic lights S1, a road sign S2 indicative of "only this way to cruise", a guidance sign S3 indicative of essential landmarks or the like, and an auxiliary sign S4 indicative of the traffic restriction time of the road sign S2 or the like are displayed.

The traffic lights S1 and the road sign S2 displayed on the display apparatus 3 in FIG. 1 are normally present in a position which is supposed to come into sight of the vehicular driver M in the situation shown in FIG. 1. However, when the light transmittance of the dimming glass plate 2 is lowered to obstruct sunlight, the region including the traffic lights S1 or the like is obstructed by the dimming glass plate 2, making the traffic lights S1 or the like unable to be directly visually recognized by a vehicular driver M. In the present embodiment, however, a scene outside the vehicle is captured by the image pickup device 4 so that the scene which should have been visible through the region of the dimming glass plate 2 is displayed as an image on the display portion 3a of the display apparatus 3, which is disposed to face the interior of the vehicular compartment. According to the shading device 1 of the embodiment, even when driving into sunlight, the vehicular driver M or other occupants can visually recognize traffic lights and a road sign and the like without overlooking them. In Japan, as road signs, the above-mentioned road sign and guidance sign and main signs including instructive signs indicative of specific permissions or instructions and alerting signs indicative of warnings or cautions; and auxiliary signs have been installed. According to the shading device 1 of the present embodiment, the scene which can be obstructed by the dimming glass plate 2 having a lowered light transmittance is displayed on the display apparatus 3, and, thus, even when driving into sunlight, the vehicular driver M can clearly recognize even letters or the like written on the guidance signs or auxiliary signs, for example.

As shown in FIG. 3A and FIG. 3B, the image pickup device 4 is disposed at the car C to capture an image pickup area 41 including a blind spot portion B of the field of vision of the vehicular driver M that is formed by the dimming glass plate 2 having a lowered light transmittance. Such image pickup device 4 disposed in the above manner captures an area including the blind spot portion B to generate image data. Based on the image pickup data, display image data is generated by the data processing circuit 5 (see FIG. 9) and sent to the display apparatus 3. Consequently, an image of a view including an area which can be the blind spot portion B is displayed on the display apparatus 3 (see FIG. 1) for the vehicular driver M. This allows the vehicular driver M to visually recognize a portion of the view that is obstructed by the dimming glass plate 2 via the display apparatus 3. This can reduce the vehicular driver M's risk of overlooking traffic lights and road signs while he/she is driving in sunlight where a shading device is used. The shading device 1 of the present embodiment is considered to contribute to ensuring traffic safety.

In the present embodiment, the shading device does not have to be moved depending on whether obstructing sunlight is needed. When obstructing sunlight is needed, merely decreasing the light transmittance of the dimming glass plate 2 can allow the sunlight to be obstructed or at least reduce the intensity thereof. Also, when obstructing sunlight is not needed, merely increasing the light transmittance of the dimming glass plate 2 and stopping image displaying by the display apparatus 3 can make the view external to the vehicle, which is supposed to be seen through a position where the dimming glass plate 2 is positioned, visible from the interior of the vehicular compartment. This reduces the inconvenience for the vehicular driver M with respect to moving of the shading device in accordance with changing incident condition of sunlight, which varies as the vehicle changes its travel direction.

In the embodiment, the dimming glass plate 2 forms a portion of the windshield CG, and the display apparatus 3 is disposed on the surface of a portion of the windshield CG that faces the interior of the vehicular compartment. In the present embodiment, therefore, an image can be displayed at a stable position for an occupant in the vehicular compartment. In addition, a change in the front-back direction is smaller when an occupant such as the vehicular driver M looking at a view forward through the windshield CG turns his/her gaze on the display apparatus 3, compared to when the occupant turns his/her gaze on a conventional shading device, and, accordingly, the occupant can easily and quickly focus his/her eyes. The moving distance of the line of vision is also expected to be shorter. Thus, the shading device 1 of the present embodiment can display a view external to the vehicle in a position which is easy to see for an occupant in the vehicular compartment, such as the vehicular driver M.

In the present embodiment, the image pickup device 4 is formed separately from the display apparatus 3. The image pickup device 4 is preferably disposed at the interior of the vehicular compartment, as shown in FIG. 3A. When the image pickup device 4 has proper durability and antifouling property, however, the image pickup device 4 can be disposed at the exterior of the vehicle. The image pickup device 4 is, as shown in FIG. 3A, preferably disposed substantially in front of the vehicular driver M in the vehicle width direction. The image pickup device 4 is, as shown in FIG. 3A, preferably disposed at an angle such that the center of the blind spot portion B that can be produced by the dimming glass plate 2 having a lowered transmittance corresponds to the center of the image pickup area 41. Also, the image pickup device 4 is, as shown in FIG. 3B, preferably disposed on a center portion in the vehicle width direction, e.g., the back surface (the surface facing ahead of the car C) of a rearview mirror RM. FIG. 3B shows an example where the dimming glass plate 2 is provided at a portion in front of the vehicular driver's seat and a second dimming glass plate 2c is provided such that it is spaced from the dimming glass plate 2 at a portion in front of the passenger's seat. The image pickup device 4 is disposed between the two dimming glass plates 2, 2c. In FIG. 3B, the blind spot portion B which can be formed by lowering the transmittance of only the dimming glass plate 2 in front of the vehicular driver's seat is shown.

As shown in FIG. 3A and FIG. 3B, the image pickup device 4 is disposed so that the image pickup area 41 covers the blind spot portion B entirely at least in a position forward from a front end C1 of the car C even though the position is far from the front end C1. For example, a camera provided with a lens having a view angle with which such an image pickup area 41 can be produced e is used as the image pickup device 4. Alternatively, the image pickup device 4 is disposed at a position and an angle that are suitable for obtaining such image pickup area 41.

The image pickup device 4 is not construed to be limited to the positions shown in FIG. 3A and FIG. 3B and can be disposed in any position which allows an appropriate image pickup area 41 to be obtained. For example, the image pickup device 4 can be disposed near the edge of the windshield CG in the vehicle width direction or on a dashboard (not shown). It is preferable that antifouling coating using an optical catalyst effect, such as titanium oxide, be applied to at least a surface facing the exterior of the vehicle of a portion of the windshield CG that faces the image pickup device 4.

The image pickup device 4 is not construed to be particularly limited if it can capture a view of a desired image pickup area and generate image pickup data of the format that can be processed with the data processing circuit 5. For example, the image pickup device 4 is exemplified by digital cameras with a CCD image sensor or a CMOS image sensor, and the like. The optical energy based on a view in an image pickup area is converted to electrical signals by light receiving elements disposed in a matrix manner inside the CCD image sensor or the like, and the image pickup data based on these electrical signals is generated. Preferably, a camera or the like having an image sensor capable of color image pickup is used as the image pickup device 4.

In FIG. 3A, in a circle Z illustrated in a chain line, the image pickup device 4 is schematically shown in an enlarged manner. The image pickup device 4 of the shading device 1 according to the present embodiment is provided with a lens 4b having a surface on which is formed a coating layer 4a which reduces reflection of light by adjusting a refractive index. The image pickup device 4 captures a view of an area exterior to scene the car through the second surface 2b of the dimming glass plate 2, which is illuminated by sunlight. Accordingly, the image pickup device 4 is required to capture an image against sunlight. The lens 4b of the image pickup device 4 is thus provided with the coating layer 4a. The coated layer 4a can reduce flare and ghosting that are likely to occur in image pickup against sunlight. The coating layer 4a can be formed by forming a large number of wedge-shaped structures of nano-size on a surface of the lens 4b or forming a layer of particulates of nano-size on the surface of the lens 4b. The image pickup device 4 is not necessarily provided with a lens having the coating layer 4a.

Figure 4A:
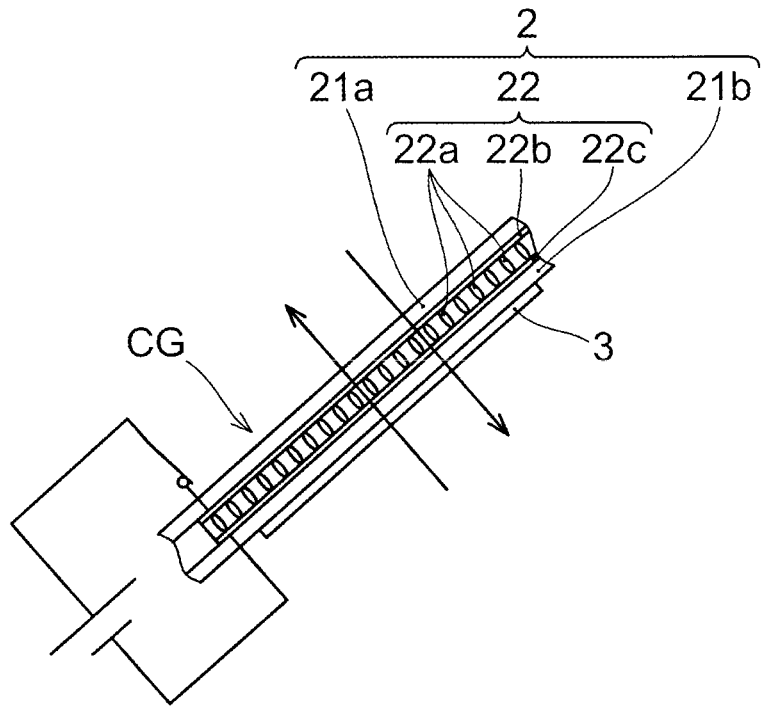
FIG. 4A shows an operation of a dimming glass plate of the shading device for the vehicle according to Embodiment 1.
Figure 4B:
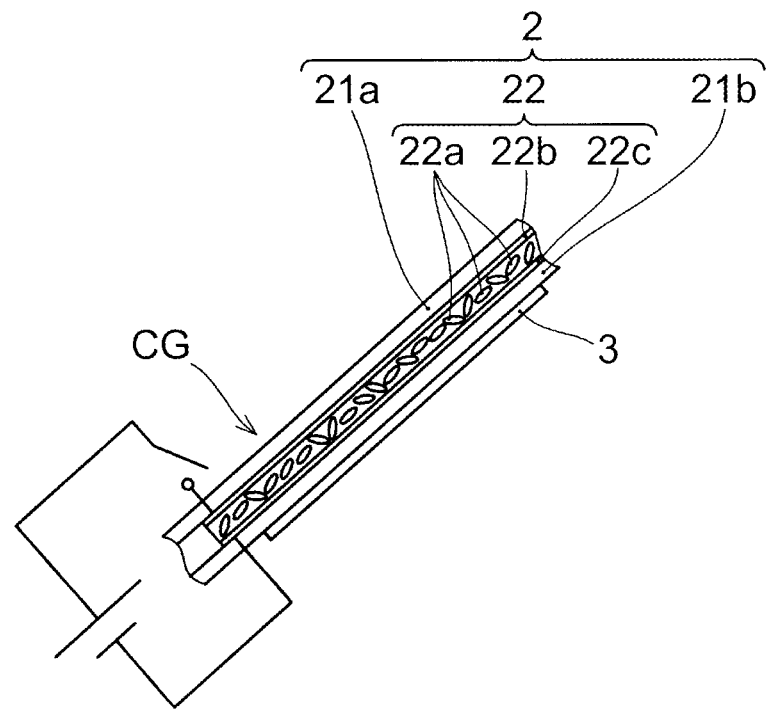
FIG. 4B shows an operation of the dimming glass plate of the shading device for the vehicle according to Embodiment 1.

Referring to FIG. 4A and FIG. 4B, an operation of the dimming glass plate 2 is described. In FIG. 4A and FIG. 4B, a cross-sectional structure of the dimming glass plate 2 is schematically shown. As shown in FIG. 4A and FIG. 4B, the dimming glass plate 2, specifically in addition to the two glass plates 21a, 21b described previously, includes: two conductive films 22b, 22c that transmit light; and liquid crystal molecules 22a sealed in between the two conductive films 22b, 22c. A liquid crystal sheet 22 is composed of the conductive films 22b, 22c and a plurality of liquid crystal molecules 22a.

In the present embodiment, the glass plates 21a, 21b form, with a transparent sheet TS (see FIG. 2), the windshield CG (see FIG. 2) in a region where the liquid crystal sheet 22 is not disposed. Although the type of the glass plates 21a, 21b is exemplified by float glass, it is not construed to be particularly limited as long as it has a certain light transmittance. Material of the conductive films 22b, 22c is also not construed to be particularly limited as long as it is light transmitting and conductive. For example, indium tin oxide (ITO) or zinc oxide or the like can be used in the conductive film 22b, 22c. As described later, the display apparatus 3 is preferably an organic EL display panel, and the display apparatus 3 preferably includes an organic material. In order to reduce stress relative to the organic material caused by ultraviolet rays or heat, it is preferable that the dimming glass plate 2 have light obstructing property against ultraviolet rays and/or infrared rays.

The liquid crystal molecule 22a has an elliptical shape. As shown in FIG. 4A, when a voltage of a given magnitude is applied between the conductive film 22b and the conductive film 22c, the plurality of the liquid crystal molecules 22a are oriented in a direction which is substantially parallel to the thickness direction of the dimming glass plate 2. Consequently, the dimming glass plate 2 can transmit light.

Alternatively, as shown in FIG. 4B, when a voltage is not applied to the conductive films 22b, 22c, the plurality of the liquid crystal molecules 22a are present in the liquid crystal sheet 22, with their own elliptical shapes respectively oriented in an arbitrary direction. In the state shown in FIG. 4B, light is obstructed by the dimming glass plate 2 (specifically, by the liquid crystal molecules 22a). The orientation of the plurality of liquid crystal molecules 22a changes based on the magnitude of the voltage that is applied between the conductive film 22b and the conductive film 22c. Therefore, the light transmittance of the dimming glass plate 2 can be controlled by controlling the magnitude of the voltage that is applied between the conductive film 22b and the conductive film 22c.

The shading device 1 of the embodiment can be configured so that a display image based on image pickup data generated by the image pickup device 4 is automatically displayed on the display apparatus 3 when the light transmittance of the dimming glass plate 2 is lower than a predetermined reference value. Operations by the vehicular driver M or the like of the vehicle that is necessary for displaying the view of a portion obstructed by the dimming glass plate when sunlight is shielded by the dimming glass plate 2 can be reduced. For example, an illuminance sensor or the like (not shown), which can detect intensity of light, is provided at a surface of the glass plate 21b of the dimming glass plate 2 that faces the vehicle compartment. Also, in order to ensure that continuous source voltage to the display apparatus 3 is not supplied all the time, a toggle switch (not shown) for a display apparatus that is different from the previously-described switch 6 is provided in a supply circuit of the source voltage, being kept all the time in the open state. The display apparatus switch is configured to be switched from the open state to the closed state when the illuminance sensor detects illuminance which shows intensity of light passing through the dimming glass plate 2 being lower than a given reference value. Consequently, the display apparatus 3 can automatically display an image when the light transmittance of the dimming glass plate 2 is lower than the given reference value. Instead of providing the illuminance sensor, a comparator for dimming glass plate (not shown) can be provided for comparing a voltage applied to the dimming glass plate 2 and a given voltage so that the open/closed state of the display apparatus switch is switched based on the output of the comparator for dimming glass plate. The display apparatus switch (not shown) can be provided in a transmission line for display image data between the display apparatus 3 and the data processing circuit 5, instead of the supply circuit of the source voltage for the display apparatus 3.

The transmittance of the dimming glass plate 2 does not necessarily corresponds to whether the display apparatus 3 displays an image. For example, when the dimming glass plate 2 has a high transmittance, an image can be displayed on the display apparatus 3. In a situation such as during nighttime where the exterior of the vehicle is dark, the display apparatus 3 can display an image which is visually recognizable sufficiently for the vehicular driver even when the dimming glass plate 2 has a high light transmittance. In such a situation, arbitrary information can be displayed on the display apparatus 3. On the other hand, if there is no target to be visually recognized in a portion obstructed by the dimming glass plate 2 having a lowered light transmittance, the display apparatus 3 can be in an off state regardless of whether the light transmittance of the dimming glass plate 2 is high or low.

Figure 4C:
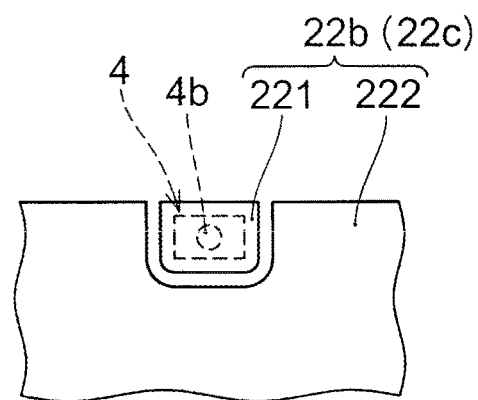
FIG. 4C shows a portion of one example of a conductive film of the shading device for the vehicle according to Embodiment 1.

When the image pickup device 4 (see FIG. 1) is disposed in the interior of the vehicular compartment, as shown in FIG. 4C, a portion of at least one of the conductive films 22*b*, 22*c* that faces the lens 4*b* of the image pickup device 4 can be formed separately from the surrounding portions thereof. Specifically, at least either one of the conductive films 22*b*, 22*c* can oppose the image pickup device 4 disposed in the interior of the vehicular compartment and can comprise a portion isolated from the surroundings (an image pickup device opposing portion 221). In this way, voltage can be applied to the image pickup device opposing portion 221 independent of another portion 222. For example, voltage can be applied only to the image pickup device opposing portion 221 to increase light transmittance of only the image pickup device opposing portion 221 of the dimming glass plate 2. Even when the transmittance of the entire dimming glass plate 2 is lowered to obstruct sunlight, a view ahead of the vehicle can be captured with no difficulty through the image pickup device opposing portion 221 with a high light transmittance. Instead of the image pickup device opposing portion 221 being provided to the conductive films 22*b*, 22*c*, a notch can be provided at a portion of the liquid crystal sheet 22 (see FIG. 4A) that is opposed to the image pickup device 4. Even such a configuration allows capturing a view ahead of the vehicle through the notch when the dimming glass plate 2 has a lowered transmittance.

The dimming glass plate 2 is preferably disposed to extend lower than the lower end position PL of the display apparatus 3 (see FIG. 2) in the vertical direction of the vehicle. This can prevent the display apparatus 3 from being illuminated by at least sunlight coming at an angle higher the horizontal direction, when obstruction of sunlight is needed. Also, it is preferable that the dimming glass plate 2 is formed to have margins no smaller than the thickness of a window (such as the windshield CG) at each of both edges in the vehicle width direction. Such a formation can prevent the display apparatus 3 from being illuminated by sunlight coming at an angle 45° or smaller from at least each of right and left relative to the front of the vehicle, when obstructing of sunlight is needed.

If a country where the shading device 1 for a vehicle according to the present embodiment to be used has a regulation specifying the lower limit of the light transmittance of a window glass of a vehicle for each region within the window glass, it is preferable that the dimming glass plate 2 be provided at a portion of a window glass where the light transmittance is not specified. Even if the light transmittance of the dimming glass plate 2 is, at its highest, lower than the lowest limit of light transmittance in that country, the shading device 1 can be used legally. Such dimming glass plate 2 having a low light transmittance can be used for the shading device 1 of the present embodiment.

Figure 5:
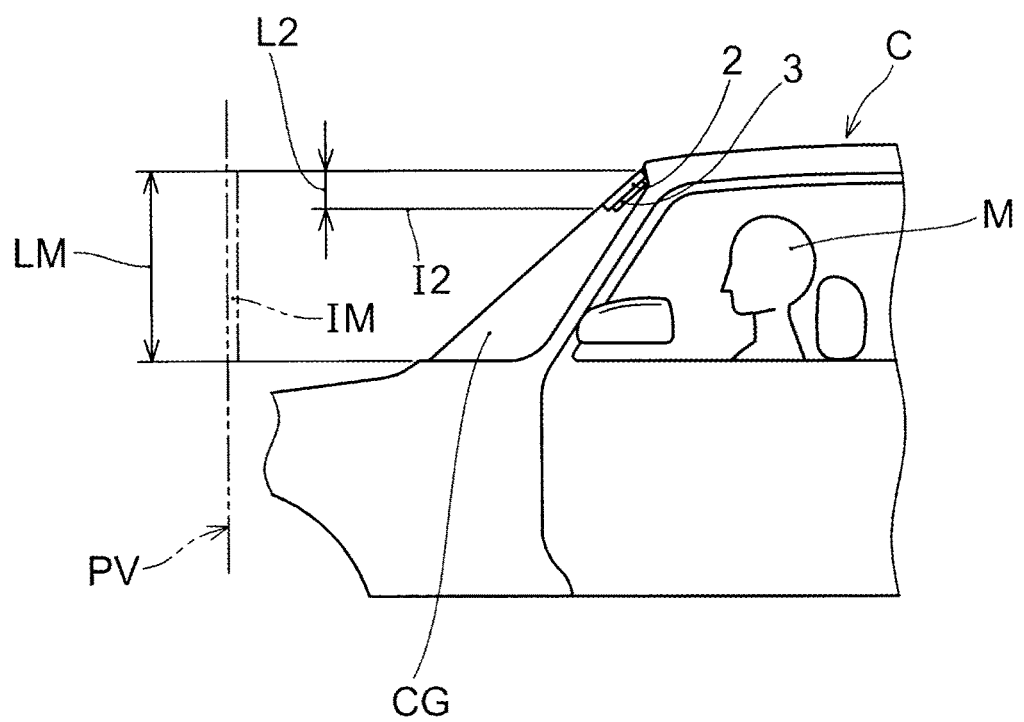
FIG. 5 shows positioning of the dimming glass plate of the shading device for the vehicle according to Embodiment 1.

For example, in Japan, "Safety Regulations for Road Vehicles", Ordinance of the Ministry of Land, Infrastructure, Transport and Tourism, specifies the standard that the visible light transmittance of the windshield of a car must be 70% and higher. However, there is no specification on the light transmittance regarding "the upper edge of the windshield that is within 20% of the actual length of the glass opening on a plane parallel to the vehicle center plane". Therefore, as shown in FIG. 5, the dimming glass plate 2 is preferably provided at least at a portion (e.g., a portion in front of the vehicular driver's seat) within upper 20% of a projection image IM of a window glass (which is the windshield CG in the present embodiment) onto a plane PV perpendicular to the front-back direction of a vehicle (which is the car C in the present embodiment). Specifically, the dimming glass plate 2 is preferably provided at a portion of the area from the upper end of the windshield CG to a straight line L2 in FIG. 5 (wherein, in FIG. 5, (the length of the line L2)/(the length of an arrow LM)=0.8). Today, the process of international harmonization of regulations covering vehicle safety and environmental protection is promoted in the World Forum for Harmonization of Vehicle Regulations, which is established under United Nations Economic Commission for Europe. In the Forum, the 1958 Agreement has 51 participating countries (regions), and the 1998 Agreement has 33 participating countries (regions). The global technical regulations regarding windshield is yet to be formulated as of 2016; however, if the Japanese regulation mentioned above is satisfied, it can be considered to satisfy at least the laws of the participating countries of the Forum mentioned above.

The display apparatus 3 is formed of a light transmitting material and fixed to the dimming glass plate 2 with, for example, an optical clear adhesive (OCA) provided in the form of sheet. Instead of OCA, an optically clear resin (OCR), which is provided in the liquid state and can be cured by UV radiation can be used to bond the display apparatus 3 to the dimming glass plate 2. The means of fixing the display apparatus 3 to the dimming glass plate 2 is not construed to be particularly limited. The display apparatus 3 is not construed to be particularly limited as long as it has an image display function and formed of a light transmitting material. One example of the display apparatus 3 is an organic EL display panel, which can be formed to be of a thin shape and does not require a color filter or a backlight that can be a factor in reducing the light transmittance. In the present embodiment, the display apparatus 3 is disposed at the dimming glass plate 2 forming a portion of the windshield CG. Because the windshield CG is inclined toward the vertical direction of the car C, when the vehicular driver M or other occupants views the display apparatus 3, the line of vision tends to be angled relative to the normal line of the display surface of the display apparatus 3. Therefore, the organic EL display panel, which has better angle-of-view viewing angle characteristics than liquid crystal display apparatuses, is also preferable in terms of visibility from the vehicular driver M or other occupants.

Furthermore, the windshield CG is usually formed to be curved toward the exterior of the vehicle both in the vertical direction and the width direction of the car, making a moderate spherical surface of the windshield CG. Therefore, the first surface 2*a* (see FIG. 2) of the dimming glass plate 2 forming a portion of the windshield CG can actually have a curved surface similar to the inner circumferential surface of a hollow sphere. When the display apparatus 3 is fixed to such a curved surface, the display apparatus 3 needs to be bent and partially stretched to be fixed so that bubbles or the like do not wind themselves toward the interface with the dimming glass plate 2. Therefore, the display apparatus 3 is preferably an organic EL display panel formed using a flexible film having a surface on which an organic material is laminated.

Figure 6:
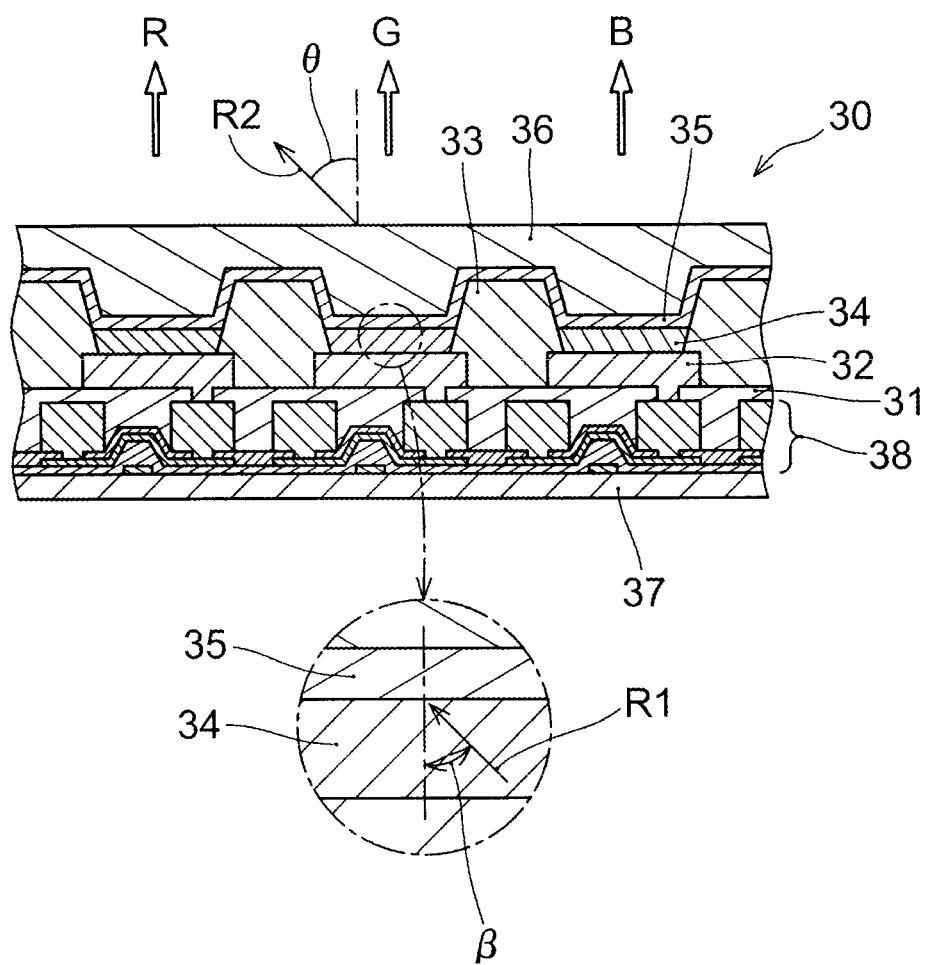
FIG. 6 shows a cross-sectional view of one example of a display apparatus of the shading device for the vehicle according to Embodiment 1.

FIG. 6 exemplifies a cross-sectional view of one pixel of an organic EL display panel 30, which can form the display apparatus 3. On a flexible film 37 that is made of a resin or the like, a switching element such as TFT 38 is formed for each of subpixels R, G, B, and a first electrode (for example, anode) 32 is formed on a planarizing film 31 that is formed on the switching element. The flexible film 37 is formed of, for example, a transparent polyimide resin. The first electrode 32 is formed of a light transmitting and conductive material, such as an ITO film, for example, and is connected to a switching element such as the TFT 38. The TFT 38 is formed of a transparent amorphous oxide semiconductor such as an oxide comprising indium, gallium, and zinc. The TFT 38 is not necessarily formed of a light transmitting material, and can be formed of, for example, a low-temperature polysilicon (LTPS) outside individual pixel regions.

In the present embodiment, as described previously, the display apparatus 3 can be stretched to be fixed to the dimming glass plate 2. Therefore, it is preferable that the TFT 38 is formed of an organic semiconductor material that can be stretched more than inorganic semiconductor materials. For example, the TFT 38 is formed of an organic semiconductor material such as pentacene, copper phthalocyanine, or fluorinated phthalocyanine.

Between the subpixels, an insulation bank 33 made of $SiO_2$ is formed. An organic layer 34 is vapor-deposited in a region surrounded by the insulation bank 33. Although the organic layer 34 is shown as one layer in FIG. 6, the organic layer 34 can be actually formed of a plurality of laminated layers made of different organic materials having different light transmittances.

On the organic layer 34, a second electrode (for example, cathode) 35 is formed so as to have transparency by forming, for example, an Mg—Ag alloy layer or an alkaline metal layer to be sufficiently thinner than the wavelength of light by means of a vapor deposition technique or the like. Further, on a surface of the second electrode 35, a protective layer 36 made of, for example, $Si_3N_4$ or the like is formed. Each element shown in FIG. 6 is entirely sealed with a sealing layer made of a resin film (shown) so that the organic layer 34 and the second electrode 35 do not absorb moisture or oxygen or the like. The cross-sectional structure shown in FIG. 6 is merely provided as an example, the structure of the organic EL display panel 30 that constitutes the display apparatus 3 and the materials for the respective components are not construed to be limited to the structure and materials described herein.

In the organic EL display panel 30 used in the shading device 1 of the embodiment, the first electrode 32 and the second electrode 35 are formed with a gap which is substantially the same in any of the subpixels R, G, B. In other words, the gap between the first electrode 32 and the second electrode 35 are not made to be intentionally different for each subpixel. On the other hand, in a general organic EL display panel, the gap between the anode and the cathode of each subpixel corresponds to the wavelength of the light of the color that is emitted by the subpixel so that the light emitted from the organic layer is repeatedly reflected between the anode and the cathode (micro-cavity structure) to increase the intensity of the light radiated perpendicular to the display surface of the panel. In other words, in the general organic EL display panel, the gap between the anode and the cathode are different for subpixel of each color.

However, with the shading device 1 of the embodiment, as described previously, the display apparatus 3 is likely to be viewed at an angle by the vehicular driver M. Therefore, it is not required in particular to increase the intensity of the light radiated perpendicular to the display surface of the display apparatus 3, and it is rather essential that the respective colors R, G, B have corresponding angle-of-view dependences so that the chromaticity does not greatly vary even with a different angle of view. Thus, the first electrode 32 and the second electrode 35 of the organic EL display panel 30 used in the shading device 1 of the present embodiment do not utilize a micro-cavity effect, unlike the general organic EL display panel. For example, the first electrode 32 and the second electrode 35 of the respective R, G, B subpixels can be generally spaced equally apart. Such configuration allows the display apparatus 3 to display an image with substantially equal quality even when the image is viewed from a direction other than a direction perpendicular to the display apparatus 3. In other words, in the shading device 1 of the embodiment, the space between the anode and the cathode of each subpixel does not need to correspond to the wavelength of the light emitted by the subpixel. Specifically, the organic EL display panel 30 can include a plurality of subpixels, each of which can include two electrodes wherein the two electrodes are disposed with a gap of a length different from the wavelength of the light emitted by each of the plurality of subpixels.

Further, in the shading device 1 of the present embodiment, it is preferable that the light in a particular direction, preferably toward the eyes of the vehicular driver, rather than the light perpendicular to the display surface of the display apparatus 3, is intensified. Therefore, it is preferable that the length of an optical path between the anode and the cathode of the light reflected between the anode and the cathode at a particular angle of reflection (angle of incidence) other than 90 degrees correspond to the wavelength of the light. Specifically, it is preferable that the two electrodes (the anode and the cathode) of each subpixel be provided so that an angle of reflection β at each electrode is smaller than 90 degrees, where an optical path length of light traveling both ways between the two electrodes (the anode and the cathode) corresponds to the wavelength of light emitted by each subpixel or an integer multiple of the wavelength. In other words, the two electrodes (the anode and the cathode) are preferably disposed with a given gap such that an optical path length of light traveling both ways between the two electrodes, reflected on at least one of the two electrodes at an angle smaller than 90° is to be a wavelength of light emitted by each of the plurality of subpixels or an integer multiple of the wavelength. Unlike the above-mentioned general organic EL display panel, a light radiated in a particular direction other than the perpendicular direction can be intensified.

For example, according to Snell's law, a cathode and an anode of each subpixel are disposed so that the above-mentioned angle of reflection β (rad) is a value given by the equation, $\sin β=\sin((π/2)-α)/n$, wherein α(rad) is the angle of the display surface of the display apparatus 3 relative to the horizontal axis of the vehicle (see FIG. 2). Also, n (dimensionless) is a ratio of the sine of the angle of incidence (angle of reflection) of a light R1 on the interface between the electrode near the light radiation surface (the second electrode 35 in the example of FIG. 6) of the display apparatus 3 (the organic EL display panel 30) and the organic layer 34 to the sine of the angle of emittance θ of a light R2 radiated from the display apparatus 3 relative to the light radiation surface of the display apparatus 3. For the display apparatus 3 disposed at an angle relative to the horizontal axis of the vehicle, light radiated in a direction parallel to the horizontal axis can be intensified. From the second electrode 35, materials of the protective layer 36 and a sealing layer (not shown), and the wavelength of light emitted by each subpixel, the ratio n is uniquely determined. Also, for intensifying the light in a direction tilted at an angle γ(rad) from the line perpendicular to the display surface of the display apparatus 3, a cathode and an anode of each subpixel are disposed so that the above-mentioned angle of reflection β is a value given by the equation, $\sin β=\sin γ/n$.

In a dot-matrix display apparatus such as an organic EL display panel, each pixel is driven by a driver 39 (see FIG.

Figure 9:
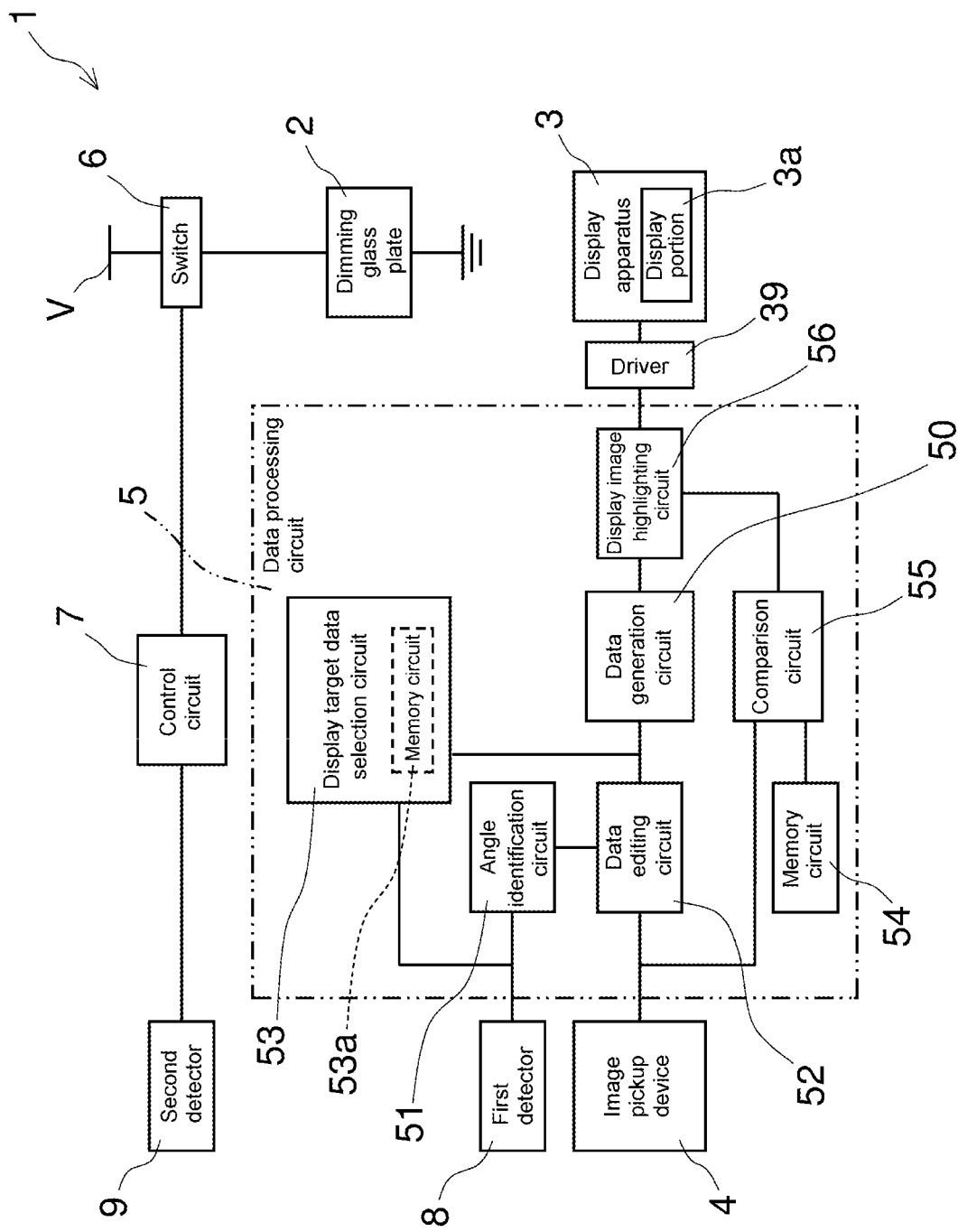
FIG. 9 is a block diagram showing main components of the shading device for the vehicle according to Embodiment 1.

7A) which generates a signal to be input to the TFT 38 based on display image data from the data processing circuit 5 (see FIG. 9). For example, the driver 39 can be composed of a display apparatus driver IC, a display apparatus driver IC mounting board, and the like. The driver 39 allows a source signal and a gate signal necessary for image display on the display apparatus 3 to be generated at an appropriate timing and, then, to be input to the TFT 38.

Figure 7A:
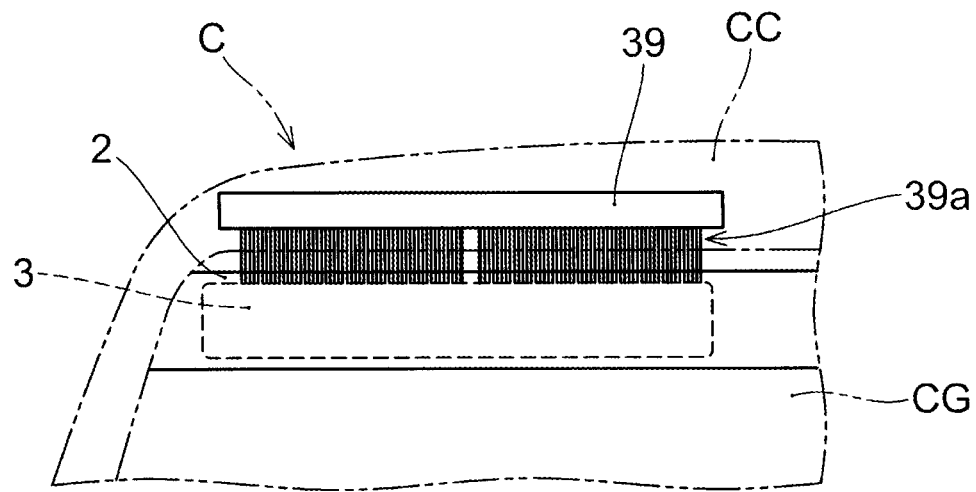
FIG. 7A shows arrangement of a driver of the display apparatus of the shading device for the vehicle according to Embodiment 1.

FIG. 7A shows an example of the arrangement of the driver 39. FIG. 7A shows a region around the dimming glass plate 2 in a front view of the car C. The car C and the windshield CG are illustrated in chain double dashed lines. As shown in FIG. 7A, the driver 39 driving pixels of the display apparatus 3 based on the display image data is disposed at a ceiling portion CC of the vehicular compartment. Furthermore, a wire 39a connecting the display apparatus 3 and the driver 39 is disposed to extend between the display apparatus 3 and the ceiling portion CC. A plurality of the wires 39a are disposed in accordance with, for example, numbers of columns and rows of a plurality of pixels arranged in a matrix in the display apparatus 3. Each of the plurality of the wires 39a is connected to the TFT of the pixels arranged in each column or row.

As described previously, the dimming glass plate 2 is preferably provided at the upper edge portion of the windshield CG. Therefore, in many cases, the display apparatus 3 is formed in a rectangular shape having the vehicle width direction of the car C as its longitudinal direction. Therefore, as shown in FIG. 7A, the driver 39 is preferably disposed at the ceiling portion CC of the vehicular compartment, and a plurality of the wires 39a extend out of the end edge of the display apparatus 3 that is parallel to the longitudinal direction of the display apparatus 3. This allows shorter internal wiring lines of the display apparatus 3 (not shown) that are provided from the proximal end to the distal end relative to the driver 39 for connecting the wiring lines 39a and the TFT in each column or row. This makes it possible to reduce voltage drop of the internal wiring lines (not shown) heat generation caused by conductor resistance of the internal wiring lines. When an organic EL display panel of current driving type is used for the display apparatus 3, the arrangement of the driver 39 as shown in FIG. 7A is particularly preferable. The driver 39 is, for example, disposed at the upper portion of the interior of the ceiling portion CC (not shown).

Figure 7B:
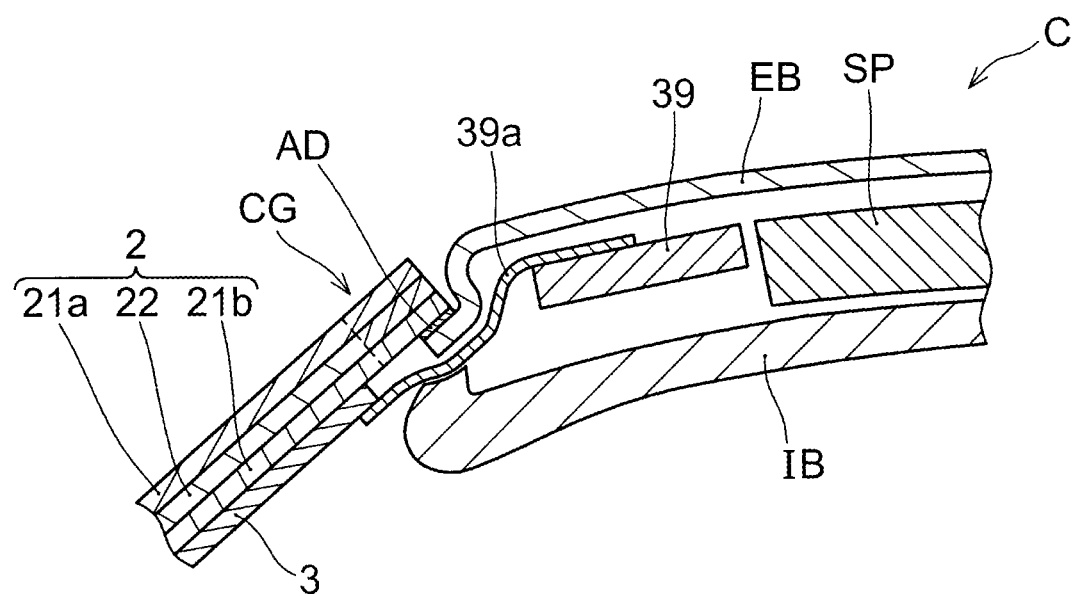
FIG. 7B shows arrangement of wires between the display apparatus and the driver in the shading device for the vehicle according to Embodiment 1.

FIG. 7B shows one example of the arrangement of the wires 39a in an enlarged cross-sectional view of a cross section which is perpendicular to the vehicle width direction. The driver 39 is disposed between an interior material IB provided at the ceiling portion of the vehicular compartment and an exterior board EB forming the roof of the vehicle (the car C). The upper edge of the window glass (the windshield CG) of the car is adhered, using an adhesive AD, to a surface of the edge of the exterior board EB. The surface of the edge faces outside of the vehicle. The dimming glass plate 2 is provided at a portion of this window glass to separate the interior of the vehicular compartment from the exterior of the vehicular compartment. As mentioned before, the dimming glass plate 2 can be provided at a portion of a surface of a window glass of the vehicle that faces the interior of the vehicular compartment. Then the wires 39a connecting the display apparatus 3 and the driver 39 are formed between the internal material IB and the exterior board EB, extending from a space in which the driver 39 is disposed, through a space between the adhesion portion of the exterior board EB with the window glass and the internal material IB, then into the vehicular compartment. The driver 39 and the display apparatus 3 can be connected with the wires 39a having a short wiring length. In the example in FIG. 7B, a sound insulation material SP is disposed between the exterior board EB and the internal material IB. The sound insulation material SP, in a manner which is different from the example in FIG. 7B, can extend to a space between the driver 39 and the exterior board EB and/or the internal material IB. The driver 39 can be fixed to a surface of the exterior board EB that faces the vehicle interior or a surface of the internal material IB that faces opposite the vehicular compartment and can be fixed to the exterior board EB or the internal material IB via the sound insulation material SP or other members. The positions in which the driver 39 is disposed is not construed to be limited to the ceiling portion of the vehicle. Also, the arrangement of the wires 39a is not construed to be limited to the example shown in FIG. 7B.

Figure 8:
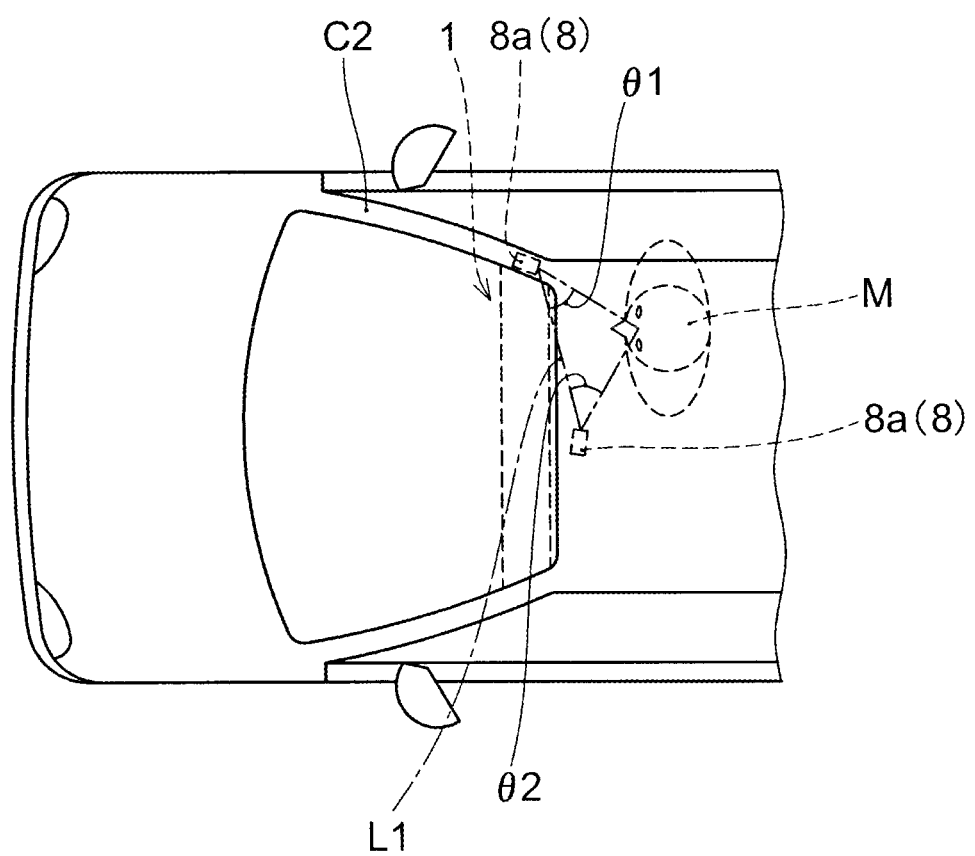
FIG. 8 shows one example of a first detector of the shading device for the vehicle according to Embodiment 1.

The shading device 1 of the present embodiment can be further provided with a detector (first detector 8) detecting positions of the eyes of the vehicular driver M. The first detector 8, as shown in FIG. 8, for example, is composed of: eye detection cameras 8a, 8b respectively installed in two known positions; and an analyzing device (not shown) analyzing a captured image by the eye detection cameras 8a, 8b. The eye detection cameras 8a, 8b are, for example, provided with a far infrared-ray sensor and generate temperature data of each portion in the image pickup area. Eyeballs of an ordinary person are characteristically lower in temperature than any other portion of the face. The analyzing device (not shown) specifies the facial position and, in addition, the positions of the eyes of the vehicular driver M in a captured image by the eye detection cameras 8a, 8b based on temperature data generated by the eye detection cameras 8a, 8b. A general digital camera can be used as the eye detection cameras 8a, 8b, and positions of the eyes can be specified by means of image recognition by the analyzing device (not shown).

Once the positions of the eyes of the vehicular driver M in the captured images by the eye detection cameras 8a, 8b are specified, angles $\theta 1$, $\theta 2$ are specified, wherein the angles $\theta 1$, $\theta 2$ are formed between a line L1 connecting the two eye detection cameras 8a, 8b in the known positions and lines respectively connecting the eye detection cameras 8a, 8b and the eyes of the vehicular driver M. Then, using trigonometry based on the length of the straight line L1 and the angles $\theta 1$, $\theta 2$, the positions of the eyes of the vehicular driver M relative to the eye detection cameras 8a, 8b are specified. A position of only either one of the eyes of the vehicular driver M can be specified or position of each of the both eyes can be specified. When the position of each of the both eyes is specified, for example, a position of the midpoint of the line connecting the eyes is calculated and the position thereof is treated as the position of the eyes of the vehicular driver M. Also, when either one of the eyes is preferentially used (for example, when the other eye of the vehicular driver M is injured or it is preferable to visually recognize an image with the dominant eye), it is preferable that the shading device 1 of the embodiment have an auxiliary unit for switching between the setting based on the both eyes to the setting based on the one eye and also selecting whether the right eye or the left eye is used. The information input to the auxiliary unit is used for data processing by a display target data selection circuit 53 described later. Each of the eye detection cameras 8a, 8b is, as shown in FIG. 8, individually disposed on a pillar C2 or in a portion near the windshield in the middle portion of the vehicular compartment in the vehicle width direction. However, the eye detection cameras 8a, 8b are not construed to be limited to be in the positions shown in FIG. 8 and can be provided in any position from which they can detect positions of the eyes of the vehicular driver M. Utilization of detection results of the first detector 8 is described later. When the second display apparatus 3b (see FIG. 1) is provided as described previously, a detector (not shown) detecting positions of the eyes of an occupant of the passenger's seat can be provided in addition to the eye detection cameras 8a, 8b for the vehicular driver shown in FIG. 8. Such detector for the passenger's seat can also be used for editing an image to be displayed on the second display apparatus 3b, as with the utilization of the first detector 8 described later.

FIG. 9 exemplifies main components of the shading device 1 of the present embodiment in a block diagram. Image pickup data generated by the image pickup device 4 is sent to the data processing circuit 5. Display image data generated by the data processing circuit 5 based on the image pickup data is sent to the driver 39, each pixel of the display apparatus 3 being driven by pixel signals generated by the driver 39. Consequently, an image based on the display image data is displayed on the display portion 3a of the display apparatus 3. The first detector 8 described above is connected to the data processing circuit 5.

As shown in FIG. 9, the shading device 1 of the present embodiment further comprises a second detector 9, and a control circuit 7 connected to the second detector 9. The control circuit 7 is connected to the switch 6. In the example of FIG. 9, the switch 6 is connected in between a power supply line V and the dimming glass plate 2. FIG. 9 is merely provided as one example of a configuration of the shading device 1 in the present embodiment, and the shading device 1 does not necessarily include all the components shown in FIG. 9 or can further include a component which is not shown in FIG. 9. Also, the internal configuration of the data processing circuit 5 is not construed to be limited to what is shown in FIG. 9. In the following, the control circuit 7, the second detector 9, and the data processing circuit 5 are described in order.

The second detector 9 detects the intensity of incident light illuminating the dimming glass plate 2. Examples of the second detector 9 include a photodiode, a photo-transistor, an illuminance sensor, and the like. However, the second detector 9 is not construed to be limited to those as long as it can output a detection result in accordance with the intensity of light. The second detector 9 is disposed preferably around the dimming glass plate 2 in the interior of the vehicular compartment or on the dashboard. The second detector 9 can be disposed in any position where it can be illuminated by sunlight illuminating the dimming glass plate 2.

The control circuit 7 controls the switch 6 so that the light transmittance of the dimming glass plate 2 is lowered when the intensity of incident light illuminating the dimming glass plate 2 exceeds a given threshold based on the detection result of the second detector 9. An output signal by the control circuit 7 is input to a control terminal of the switch 6 (not shown). The control circuit 7 compares the detection result of the second detector 9 with a given threshold, and, if the detection result of the second detector 9 indicates that it is illuminated by incident light having an intensity equal to or greater than the given threshold, the control circuit 7 controls the switch 6 to be in the open state. Application of a voltage from the power supply line V to the dimming glass plate 2 is stopped. As a result, as described previously, the light transmittance of the dimming glass plate 2 is reduced, and the sunlight is shielded by the dimming glass plate 2. As described before, if the switch 6 changes the magnitude of the voltage to be input to the dimming glass plate 2 in a stepwise or continuous manner, it is preferable that the control circuit 7 accordingly changes the state of the switch 6 in multiple steps. The control circuit 7 can be composed of a combination of, for example, a comparator and several gate elements. Also, the control circuit 7 can be formed by a portion of a microcomputer or a gate array and can be included in the data processing circuit 5.

The data processing circuit 5 comprises a data generation circuit 50, an angle identification circuit 51, a data editing circuit 52, a display target data selection circuit 53, a memory circuit 54, a comparison circuit 55, and a display image highlighting circuit 56, which are circuit blocks each having a unique function. The display target data selection circuit 53 comprises a memory circuit 53a. These circuit blocks can partially or entirely share the same circuit element. The data processing circuit 5 can be formed of a microcomputer, an ASIC, or any semiconductor device for signal processing, such as an FPGA, and its peripheral circuits. The microcomputer or the like operates in accordance with the software that defines given processing procedures. Each circuit block in the data processing circuit 5 can be individually formed of a semiconductor integrated circuit device or discrete semiconductor elements.

The data generation circuit 50 is a circuit block responsible for performing basic functions of the data processing circuit 5, and, based on image pickup data, generates display image data including information related to light emission intensity and light emission timing of each pixel of the display apparatus 3. The data generation circuit 50 can be a so-called timing controller with its peripheral circuit, which is used, for example, to generate a drive signal for an organic EL display panel or the like and operates in accordance with software that specifies given processing procedures.

Figure 10A:
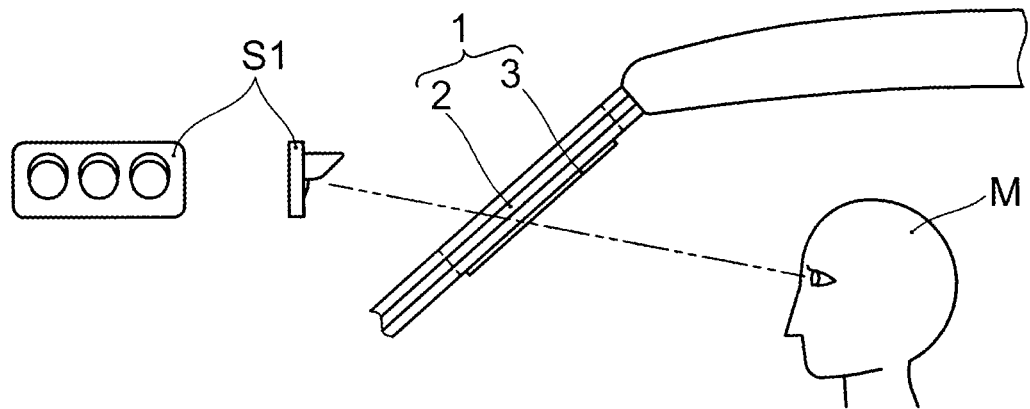
FIG. 10A shows a vehicular driver looking outward of the vehicle through the shading device for the vehicle according to Embodiment 1.
Figure 10B:
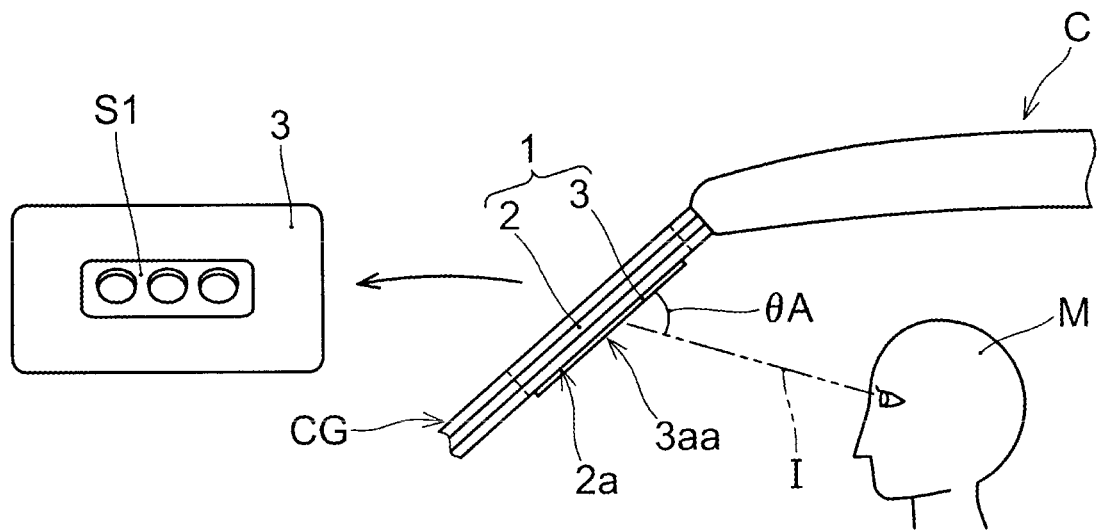
FIG. 10B shows the vehicular driver's line of view relative to the shading device for the vehicle according to Embodiment 1.

In the following, functions of the data editing circuit 52 and the angle identification circuit 51 are described with reference with FIGS. 10A, 10B, 11A, and 11B. FIG. 10A shows the vehicular driver M looking at traffic lights S1 through the shading device 1 when the dimming glass plate 2 of the shading device 1 has a high light transmittance. As exemplified on the left in FIG. 10A, an image of the traffic lights S1 is perceived by the eyes of the vehicular driver M in a generally proper manner. On the other hand, FIG. 10B shows the dimming glass plate 2 obstructing the field of view ahead and the vehicular driver M looking at the traffic lights S1 displayed on the display apparatus 3 of the shading device 1. In the present embodiment, the display apparatus 3 is disposed on the first surface 2a of the dimming glass plate 2 forming a portion of the windshield CG. Because the windshield CG is inclined relative to the vertical direction of the car C, the image of the traffic lights S1 is, as shown on the left in FIG. 10B, perceived by the eyes of the vehicular driver M in a shape which is vertically reduced and deformed.

The data editing circuit 52 edits the image pickup data to display an image based on the image pickup data, being enlarged at least in one direction, on the display apparatus 3 so that the image displayed on the display apparatus 3 is properly perceived by the eyes of the vehicular driver M. For example, the data editing circuit 52 replaces data of a pixel two up from a center pixel in the vertical direction of a region displayed on the display apparatus 3 of image pickup data with data of a pixel one up from the center pixel. Also, data of pixel three up from the center pixel and data of pixel four up therefrom are replaced with the data of the pixel two up from the center pixel (data before being replaced as described previously). The data editing circuit 52 performs such data correction on image pickup data corresponding to the region to be displayed on the display apparatus 3 both in the upward and downward directions. By performing such correction, the image displayed on the display apparatus 3 can be enlarged to twice in the vertical direction. For example, an arbitrary reference position is assumed as an eye position of the vehicular driver M, a fixed enlargement ratio is determined based on the above-mentioned reference position and the angle of the display apparatus 3 (e.g., an angle relative to the vertical direction of the car C), and the image is enlarged at the fixed enlargement ratio is displayed on the display apparatus 3.

Also, the data editing circuit 52 can edit image pickup data, based on an angle θA of a line of vision I of the vehicular driver M that is directed toward the display portion 3a relative to the display portion 3a of the display apparatus 3 (see FIG. 1). In that case, the data editing circuit 52 cooperates with the angle identification circuit 51.

The angle identification circuit 51 identifies, based on detection result of the first detector 8, the angle θA of the line of vision of the vehicular driver M that is directed toward the display portion 3a relative to the display portion 3a of the display apparatus 3 (see FIG. 1). Specifically, the angle identification circuit 51 identifies the angle θA between a display surface 3aa of the display portion 3a and the line of vision I of the vehicular driver M. Because the display apparatus 3 is fixed to the windshield CG, the positional relationship between the display apparatus 3 and the two eye detection cameras 8a, 8b (see FIG. 8) is known. Also, as described previously, the first detector 8 can detect positions of the eyes of the vehicular driver M relative to the eye detection cameras 8a, 8b. Thus, the positions of the eyes of the vehicular driver M relative to the display apparatus 3 can also be specified, and the direction of the line of vision I of the vehicular driver M that is directed toward the display apparatus 3 can be determined. Also, the display apparatus 3 is fixed to the windshield CG, and thus the angle of the display surface 3aa of the display apparatus 3 is unchanged. Therefore, based on a detection result of the first detector 8, the angle θA between the display surface 3aa of the display apparatus 3 and the line of vision I of the vehicular M can be determined. The angle identification circuit 51 operates in accordance with, for example, software or the like including procedures for specifying the angle θA in this manner.

When the angle θA is specified by the angle identification circuit 51 in this manner, the data editing circuit 52 can select the enlargement ratio in which an image to be displayed on the display apparatus 3 is enlarged in the vertical direction based on the difference Δθ between the angle θA and a given reference angle. For example, as the angle θA between the display surface 3aa of the display apparatus 3 and the line of vision I of the vehicular driver M departs from the reference angle of 90 degrees, a display image is vertically stretched at a greater enlargement ratio. It can also be considered that, due to malfunctioning of the first detector 8 and the presence of factors impeding the detection function (e.g., the vehicular driver M wearing sunglasses), detection of positions of the eyes of the vehicular driver M be not possible over an extended period of time. In such a case, the data editing circuit 52 can select the image enlargement ratio, assuming that the eyes of the vehicular driver M are in reference positions that are set in advance. Also, if the first detector 8 is in a situation where detection of positions of the eyes is temporarily not possible, such as when the operation of the first detector 8 is unable to follow the eyes of the vehicular driver M moving rapidly, the data editing circuit 52 can determine an image enlargement ratio based on the positions of the eyes detected immediately before the first detector 8 falls into such a situation.

Figure 11A:
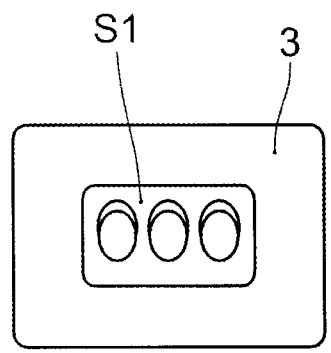
FIG. 11A shows a display image processed by a data processing circuit of the shading device for a vehicle according to Embodiment 1.
Figure 11B:
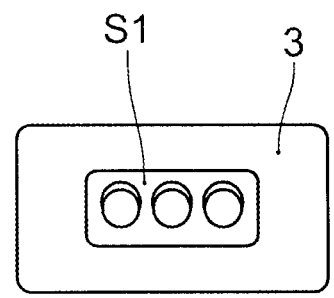
FIG. 11B shows the display image of FIG. 11A in a shape as perceived by the eyes of the vehicular driver.

The data processing circuit 5 generates display image data in the data generation circuit 50 based on image pickup data edited by the data editing circuit 52. By doing so, an image based on the image pickup data is enlarged in one direction to be displayed on the display apparatus 3. When the shading device 1 comprises the first detector 8 and the angle identification circuit 51, the image based on the image pickup data is enlarged in a vertical direction, for example, based on the positions of the eyes of the vehicular driver M to be displayed on the display apparatus 3. For example, as shown in FIG. 11A, on the display apparatus 3, a vertically enlarged image is actually displayed. However, a vehicular driver perceives an image of a shape close to the shape of an actual display target (the traffic lights S1 in FIG. 11B) as shown in FIG. 11B. By doing so, it is believed that recognition of the display target becomes easier for the vehicular driver. The data editing circuit 52 can make a correction to the display image data generated by the data generation circuit 50.

The data editing circuit 52 can edit the image pickup data so that an image based on the image pickup data is enlarged in the vehicle width direction in addition to or instead of the vertical direction of the vehicle as described above to be displayed on the display apparatus 3. Then the data processing circuit 5 can generate display image data based on imaging data being edited by the data editing circuit 52 that performs data editing in such a manner. Consequently, an image based on the image pickup data can be displayed on the display apparatus 3, being enlarged in the vehicle width direction or both in the vehicle width direction and the vertical direction based on the positions of the eyes of the vehicular driver M or on any reference position.

Figure 12:
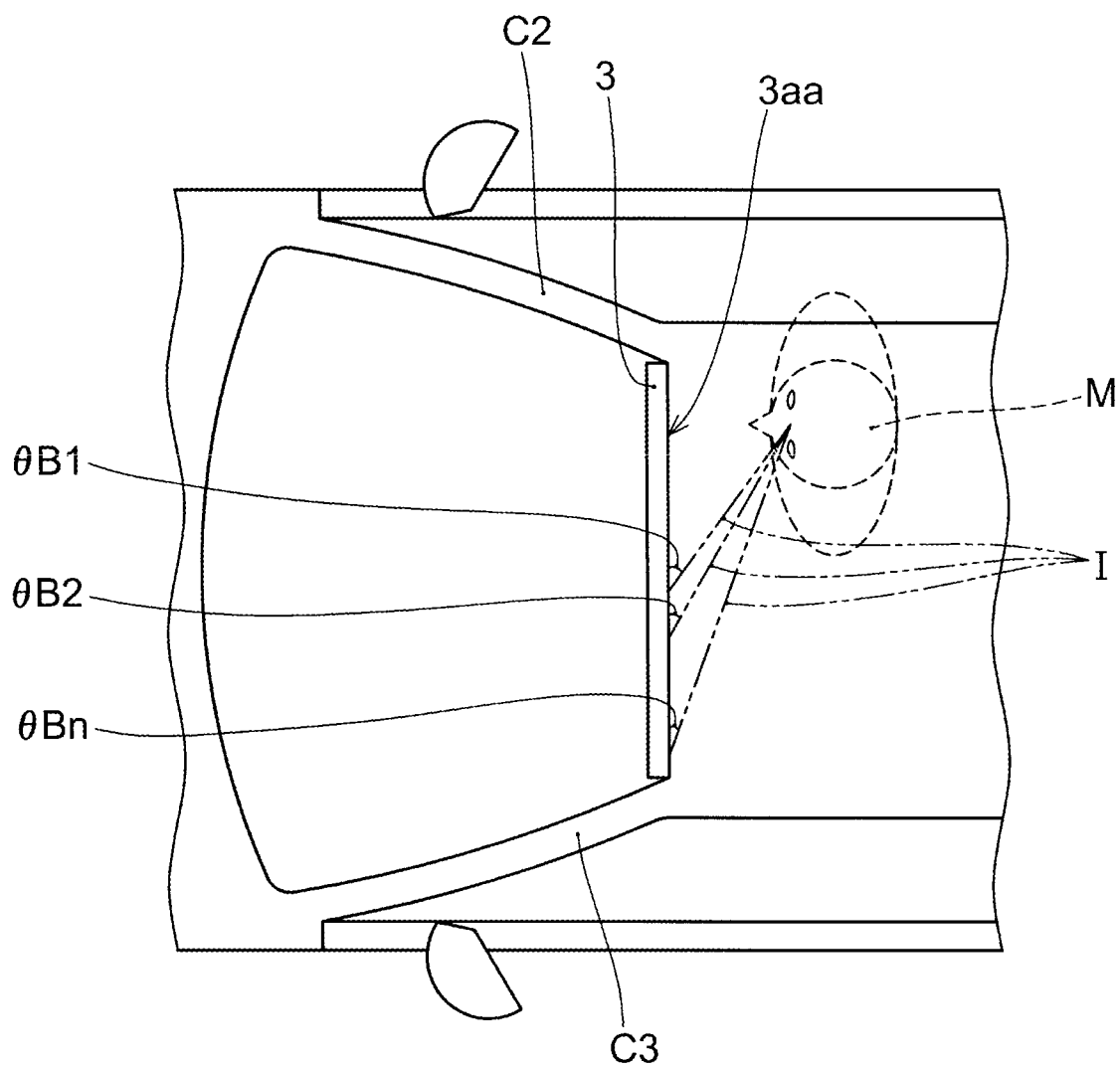
FIG. 12 illustrates the vehicular driver's line of view relative to the display apparatus at a portion closer to a passenger's seat of the shading device for the vehicle according to Embodiment 1.

For example, as shown in FIG. 12, when the display apparatus 3 is provided over the entirety of the vehicle width direction, an acute angle that departs from the right angle in a relatively great manner can be formed between the line of vision I of the vehicular driver M and the display surface 3aa, which is a portion of the display apparatus 3 near the passenger's seat. (FIG. 12 shows, for clarity, the display apparatus 3 as being disposed along the vertical direction of the vehicle). Therefore, an image displayed on a portion of the display apparatus 3 near the passenger's seat is perceived by the eyes of the vehicular driver M in a deformed shape, as with the display image exemplified FIG. 10B, however, different from FIG. 10B, being reduced in the horizontal direction. This is also the case where the second display apparatus 3b (see FIG. 1) is provided. The data editing circuit 52 can edit image data in the vehicle width direction, as in the previously-described processing in the vertical direction, in cooperation with the above-described first detector 8 and angle identification circuit 51. As a result, an image allowing easy recognition of the display target for the vehicular driver M can be displayed even at a portion of the display apparatus 3 near the passenger's seat and on the second display apparatus 3b.

Also, as shown in FIG. 12, angles θB1, θB2, . . . θn (angles in the horizontal plane) formed by the line of vision I of the vehicular driver M and the display surface 3aa of the display apparatus 3 (angles in the horizontal plane) depart greatly from the right angle at a position farther away from the vehicular driver M in the vehicle width direction. Therefore, in a position farther away from the vehicular driver M, it is believed that it is more difficult for the vehicular driver M to recognize the display image. The data editing circuit 52 can, based on the display position in the vehicle width direction, select an enlargement ratio in which the display image is horizontally enlarged so that an image with good visibility is displayed in any position of the display apparatus 3 and the second display apparatus 3*b* in the vehicle width direction. Specifically, the data editing circuit 52 can edit the image pickup data so that an image displayed in a position farther away from the vehicular driver's seat in the vehicle width direction is enlarged in the vehicle width direction at a greater enlargement ratio. For example, the data editing circuit 52 can edit the image pickup data so that an image displayed in the vicinity of a position at which an angle θB2 is formed with the line of vision I of the vehicular driver M in FIG. 12 is displayed as being enlarged in the vehicle width direction in a greater enlargement ratio than an image displayed in the vicinity of a position at which an angle θB1 is formed with the line of vision I. By doing so, an image to be displayed in a position farther away from the vehicular driver's seat in the vehicle width direction is enlarged in the vehicle width direction in a greater enlargement ratio to be displayed on the display apparatus 3 and/or the second display apparatus 3*b* (see FIG. 1). Consequently, an image easily recognized by the vehicular driver M or other occupants over the entire length in the vehicle width direction can be displayed on the display apparatus 3 and the second display apparatus 3*b*. As in the above-described enlargement in the vertical direction of the vehicle, the data editing circuit 52 can edit the image pickup data for enlargement in the vehicle width direction without cooperating with the first detector 8 and the angle determination circuit 51. Specifically, the data editing circuit 52 can edit the image pickup data with an enlargement ratio given for each display position of the display apparatus 3 and the second display apparatus 3*b* in the vehicle width direction relative to the reference position of the eyes of the vehicular driver M.

Figure 13:
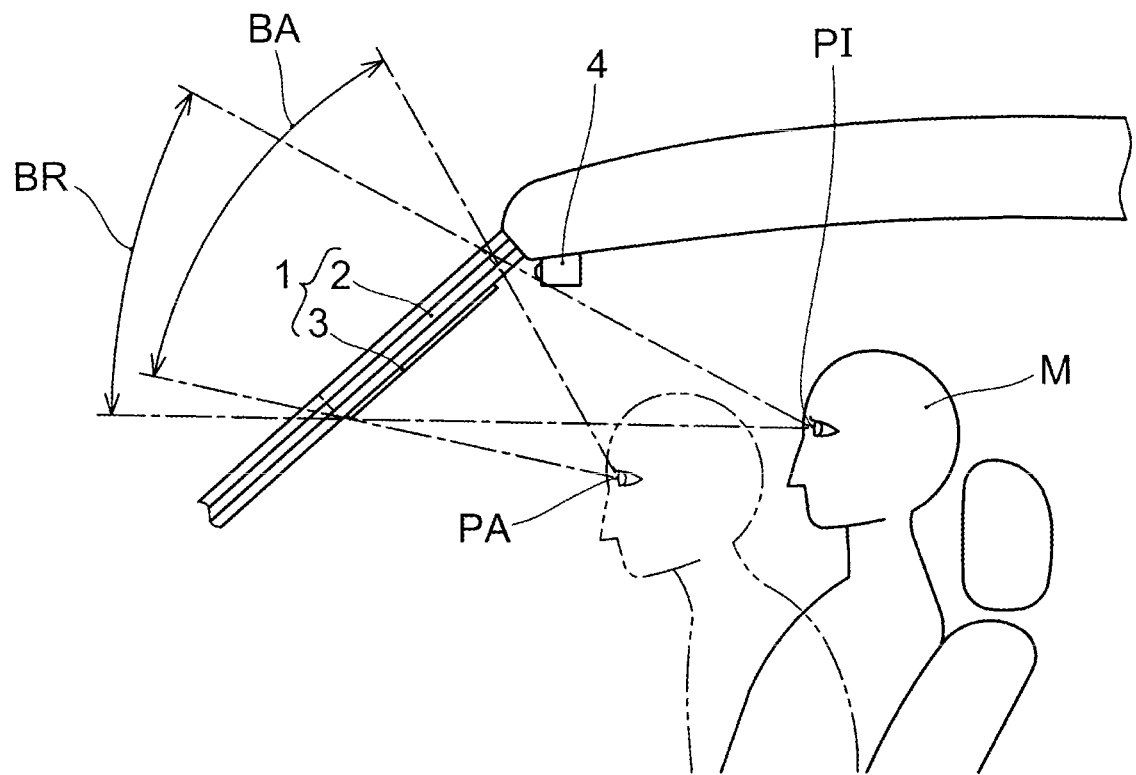
FIG. 13 shows an example of the blind spot portion while the shading device for a vehicle according to Embodiment 1 is obstructing sunlight.
Figure 14:
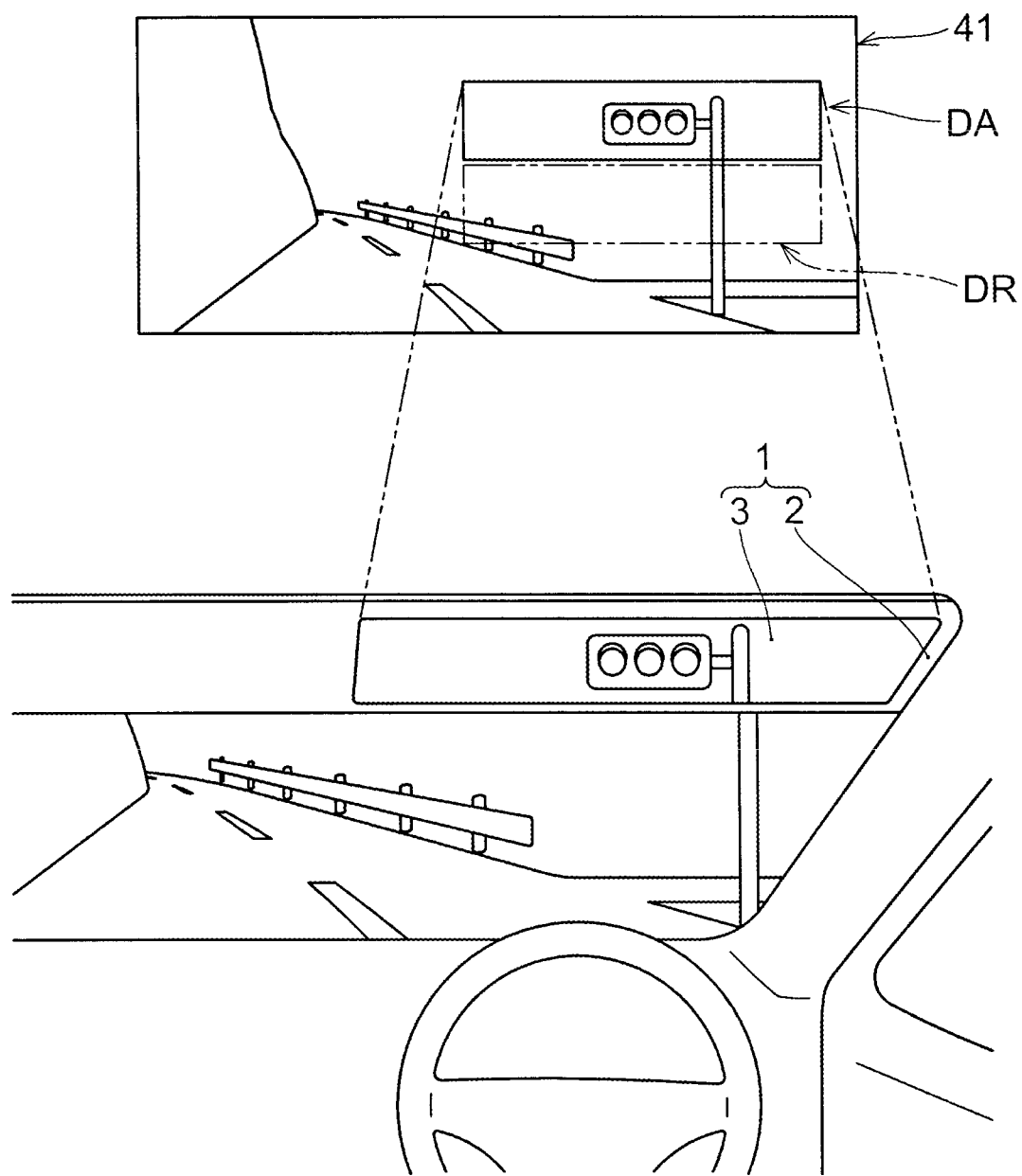
FIG. 14 shows one example of a display image corresponding to the blind spot portion while the shading device for the vehicle according to f Embodiment 1 is obstructing sunlight.

Next, referring to FIG. 13 and FIG. 14, functions of the display target data selection circuit 53 (See FIG. 9) will be described.

It is considered to be preferable that the display apparatus 3 display only the view of the blind spot portion that occurs in the field of vision of the vehicular driver M when the light transmittance of the dimming glass plate 2 is low in terms of the image being perceived by the eyes of vehicular driver M without unnatural feeling. As shown in FIG. 13, once the reference position PI of the eyes of the vehicular driver M is assumed, based on the reference position PI and the size of the dimming glass plate 2, the blind spot portion in the image pickup area of the image pickup device 4 (the reference blind spot portion BR) is determined. The image pickup area is fixedly determined by the position and characteristics of the image pickup device 4. If the positions of the eyes of the vehicular driver M are fixed, a region corresponding to the reference blind spot portion BR (a reference display target region) of the image pickup data is made the display target region, thereby allowing the display apparatus 3 to always display only the view of the blind spot portion. However, the positions of the eyes of the vehicular driver M move, and the blind spot portion varies accordingly. Therefore, it is preferable to change the display target region in accordance with the change of the blind spot portion. In order to achieve such image display, the display target data selection circuit 53 determines the blind spot portion obstructed by the dimming glass plate 2 in the field of vision of the vehicular driver M in the vehicle (the car C in the present embodiment) and selects the display target data, among the image data, corresponds to the blind spot portion.

The first detector 8 is connected to the display target data selection circuit 53 (See FIG. 9). Thus, information on the positions of the eyes of the vehicular driver M is input to the display target data selection circuit 53. Also, the display target data selection circuit 53 comprises the memory circuit 53*a* (See FIG. 9). The memory circuit 53*a* stores information regarding the difference between the blind spot portion BA that occurs by being obstructed by the dimming glass plate 2 for each of various positions of the eyes of the vehicular driver M, and the reference blind spot portion BR. FIG. 13 shows, as one example, the blind spot portion BA when the eyes of the vehicular driver M are in a position PA. For example, the memory circuit 53*a* stores a movement amount in the vertical direction and in the horizontal direction relative to the reference blind spot portion BR and an enlargement ratio or a reduction rate, and the like that are required for obtaining the position of the actual blind spot portion BA. The display target data selection circuit 53 specifies the position of the actual blind spot portion BA by way of numeric calculation or the like, based on the information on the positions of the eyes of the vehicular driver M from the first detector 8 and the stored contents of the memory circuit 53*a*. The display target data selection circuit 53 then selects, from the image pickup data, the data of the region corresponding to the actual blind spot portion BA as display target data to be a display target.

Then the data generation circuit 50 generates display image data based on the selected display target data so that the view of the actual blind spot portion BA is displayed on the display apparatus 3. Consequently, as shown in FIG. 14, the display apparatus 3 displays an image of the display target region DA to be actually displayed, wherein the image of display target region DA has been modified (shifted upward in the example of FIG. 14) from the reference display target region DR corresponding to the reference blind spot portion BR (see FIG. 13) in the image pickup area 41. This allows the display apparatus 3 to display an image without unnatural feeling in comparison to the view seen through the windshield.

The display target data selection circuit 53 can perform processing, similar to the above-mentioned processing performed in the vertical direction, in the vehicle width direction using the detection result of the first detector 8 to select an appropriate display target region corresponding to the blind spot portion in the field of vision of the vehicular driver M also for the displacement of the eyes of the vehicular driver M in the vehicle width direction. For example, as described above, when the display apparatus 3 is provided over the entire vehicle width direction or when the second display apparatus 3*b* (see FIG. 1) is provided, an appropriate display target region can be selected for the positions of the eyes of the vehicular driver M. In other words, positions in the field of vision of the vehicular driver M of the end edge at the edge at a pillar C3 (see FIG. 12) on the passenger's seat and the end edge at the edge at a pillar C2 (see FIG. 12) on the vehicular driver's seat of the dimming glass plate 2 are known in accordance with the positions of the eyes of the vehicular driver M. Information on the difference between the blind spot portion that occurs due to the dimming glass plate 2 provided over the entirety of the vehicle width and the reference blind spot portion is, as described above, stored for each of various positions of the eyes of the vehicular driver M, and this information is referred to so that an appropriate display target region also in the vehicle width direction can be selected. In this case, on the portion of the display apparatus 3 in front of the passenger's seat or the second display apparatus 3*b*, an image based on the blind spot portion obstructed by the portion of the dimming glass plate 2 in front of the passenger's seat of the view as seen by the vehicular driver M can be displayed. By doing so, an image without unnatural feeling for the vehicular driver M can be displayed on the display apparatus 3 in front of the passenger's seat.

The display target data selection circuit 53 can have a function of cancelling fine shaking of image display caused by a slight relative motion of the vehicular driver M to a vehicle body. For example, when information from the first detector 8 (see FIG. 9) varies frequently at or more than a given level, the display target data selection circuit 53 can be configured to have a longer period of sampling the information from the first detector 8. Also, when the change of the positions of the eyes of the vehicular driver M does not meet a given condition, the display target data selection circuit 53 can be configured so that a selection operation of the display target data is not newly commenced. Also, a low pass filter can be provided at an input portion that receives the information from the first detector 8 in the display target data selection circuit 53.

Figure 15:
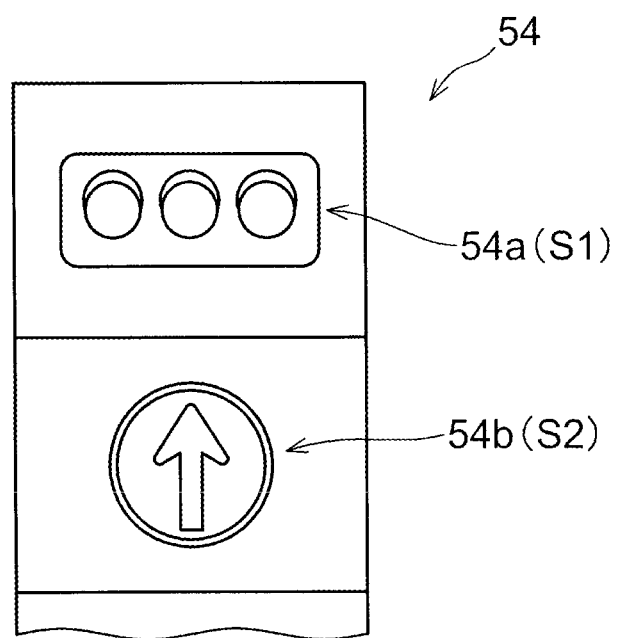
FIG. 15 conceptually shows one example of data to be stored in a memory circuit of the shading device for the vehicle according to Embodiment 1.

Next, referring to FIGS. 15, 16A, and 16B, functions of the display image highlighting circuit 56, the comparison circuit 55, and the memory circuit 54 (see FIG. 9) will be described.

The memory circuit 54 stores reference data related to an appearance feature of a given target which can be captured by the image pickup device 4 (see FIG. 1). In FIG. 15, an example of reference data 54a, 54b stored in the memory circuit 54 is conceptually shown as an image which can be reconstructed from the reference data 54a, 54b. In other words, as shown in FIG. 15, the appearance features of targets such as traffic lights S1 and a road sign S2 that can be captured by the image pickup device 4 is stored in the memory circuit 54 as data. For example, the memory circuit 54 stores image pickup data generated by actually shooting the traffic lights S1 with the image pickup device 4. Alternatively, modeling of the shape of the traffic lights S1 or the like can be performed with unit elements such as microtriangles so that the reference data 54a, 54b can be formed using the vertex coordinates of the respective unit elements. The reference data can be formed in any method. The memory circuit 54 is not construed to be particularly limited, but is composed of, for example, any semiconductor storage device such as an SRAM or a PROM. The same storage device can be shared between this memory circuit and the memory circuit 53a of the display target data selection circuit 53 that is described previously.

The comparison circuit 55 compares the image pickup data generated by the image pickup device 4 and the reference data 54a, 54b stored in the memory circuit 54. For example, the comparison circuit 55 can reconstruct the image pickup data and the reference data 54a, 54b into images and then compare these items of data by means of a pattern recognition technique. Also, if the data formats of the image pickup data and the reference data 54a, 54b are the same, they can be sequentially compared with each other as actual data in bits or bytes. The comparison method to be performed by the comparison circuit 55 is not construed to be limitative in particular. By comparison between the image pickup data and the reference data 54a, 54b, the comparison circuit 55 detects, if it exists, approximate image pickup data, which is approximate to either of the reference data 54a, 54b such that it meets given determination criteria.

When approximate image pickup data is detected as a result of the comparison by the comparison circuit 55, the display image highlighting circuit 56 highlights and display a display image of a given target to be displayed based on the approximate image pickup data, on the display apparatus 3, more significantly than other display images. Specifically, the display image highlighting circuit 56 edits the display image data that is generated based on the approximate image pickup data from the display image data generated by the data generation circuit 50 (see FIG. 9).

Figure 16A:
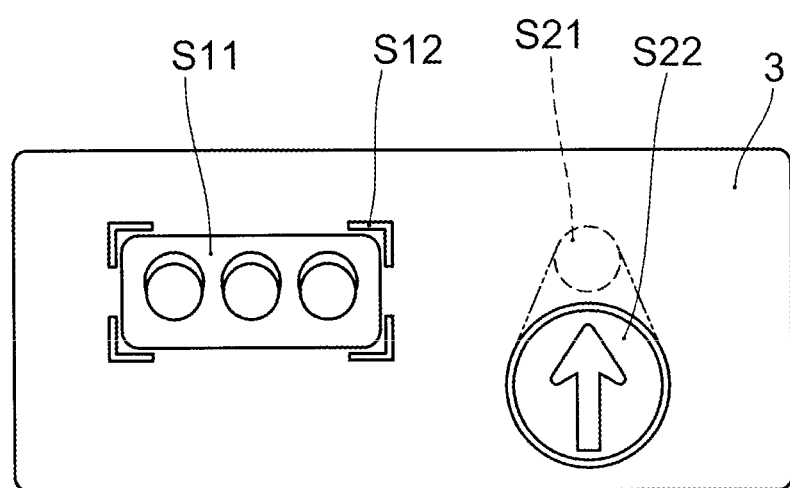
FIG. 16A shows one example of an image displayed with targets emphasized by the shading device for the vehicle according to Embodiment 1.
Figure 16B:
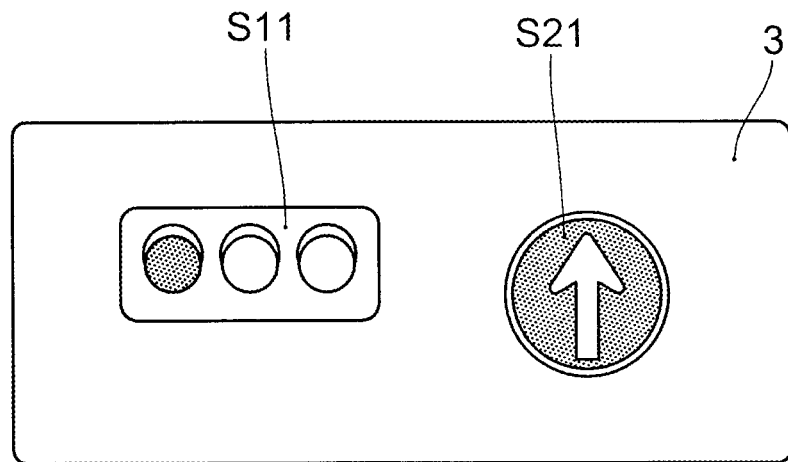
FIG. 16B shows another example of an image displayed with targets emphasized by the shading device for the vehicle according to Embodiment 1.

For example, as shown on the left in the display apparatus 3 of FIG. 16A, the display image highlighting circuit 56 edits the data of pixels around an image S11, which is a highlight target (traffic lights), and displays a frame S12 surrounding the image S11 so that the image S11 stands out. Also, as shown on the right in the display apparatus 3 of FIG. 16A, processing of the data of pixels around the image S21, which is a highlight target (a road sign), can be performed so that an enlarged image S22 of the image 21 is displayed. In addition, in order to highlight a specific color (for example, red or blue) in the display images S11, S21, which are the highlight targets, as shown in FIG. 16B, the display image highlighting circuit 56 can increase the luminance of subpixels for the specific color.

Further, when approximate image pickup data is detected, the display image highlighting circuit 56 can be used so that the display apparatus 3 displays an image to be displayed based on the image pickup data including the approximate image pickup data as a still image in a given time frame. For example, the display image data generated by the data generation circuit 50 is recorded any time in a video memory (not shown). Further, when approximate image pickup data is detected, the display image data to be sent to the display apparatus 3 can be changed, during a given period of time, from the data generated by the data generation circuit 50 any time to the data recorded in the video memory (not shown). It is construed that the display image highlighting circuit 56 can highlight a specific image in any manner without being limitative thereto. Such highlighting can increase the visibility of a target which needs to be recognized by the vehicular driver M.

<Embodiment 2>

Figure 17:
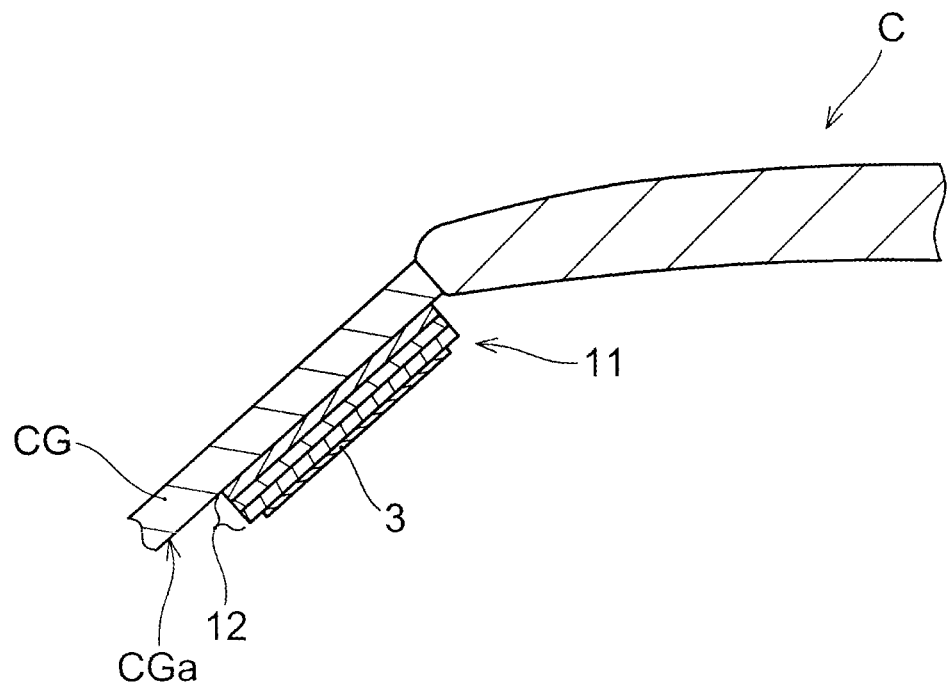
FIG. 17 is a cross-sectional view showing one example of the shading device for a vehicle according to Embodiment 2 of the present invention.

FIG. 17 shows a shading device 11 of a vehicle according to Embodiment 2 in a cross-sectional view in a position corresponding to FIG. 2. The shading device 11 of the vehicle according to Embodiment 2 is different from the shading device 1 of the vehicle according to Embodiment 1 in that a dimming glass plate 12 is provided not at a portion of a window glass (the windshield CG) of the vehicle (the car C) but at a portion of a surface CGa of the window glass CG of the vehicle C that faces the interior of the vehicular compartment. The dimming glass plate 12 and the windshield CG are fixed to each other, for example, with the above-mentioned OCA or OCR, or the like exemplified as the adhesive for the display apparatus 3 and the dimming glass plate 2. The dimming glass plate 12 and the windshield CG can be bonded in any method which does not significantly lower the transmittance of the light passing through the shading device 11 and the windshield CG. In the shading device 11 of the vehicle according to Embodiment 2, the dimming glass plate 12 can be formed separately from the windshield CG, which is larger than the dimming glass plate 12. The dimming glass plate 12 can be formed in a relatively easy manner.

The dimming glass plate 12 has a structure similar to the dimming glass plate 2 of the shading device 1 of the vehicle according to Embodiment 1 and works in a manner similar to thereto. Also, the display apparatus 3, an image pickup device (not shown), a data processing circuit, and a switch of the shading device 11 of the vehicle, according to Embodiment 2 have structures similar to the display apparatus 3, the image pickup device 4, the data processing circuit 5, and the switch 6, respectively of the shading device 1 according to the vehicle of Embodiment 1 and work in a manner similar thereto. Further, the shading device 11 of the vehicle of Embodiment 2 also can comprise a first and a second detector, which can also work in a manner similar to the first and second detector 8, 9 of the shading devices 1 of the vehicle of Embodiment 1. Therefore, further explanation for each component of the shading device 11 of the vehicle of Embodiment 2 will be omitted.

So far, examples of the shading devices 1, 11 of the vehicles of the embodiments which are used for a windshield of a car have been explained. However, the shading devices 1, 11 of the vehicles of each of the embodiments are not construed to be limited to be used in a windshield, but it can be adapted to any vehicular window glass including a rear windshield of a car.

<Summary>

A shading device for a vehicle according to an aspect 1 of the present invention comprises: a dimming glass plate capable of changing a light transmittance thereof, wherein the dimming glass plate is provided at a portion of a vehicular window glass to separate an interior of a vehicular compartment from outside of the vehicular compartment or provided at a portion of a surface of the vehicular window glass that faces inside of the vehicular compartment; a display apparatus formed of a light transmitting material and disposed at a surface of the dimming glass plate that faces inside of the vehicular compartment, with a display portion facing inside of the vehicular compartment; an image pickup device to capture an area outside of a vehicle to generate image pickup data, wherein the area is at an opposite surface on the dimming glass plate, the opposite surface being opposite a surface on which the display apparatus is provided; a data processing circuit to generate display image data to be displayed on the display portion based on the image pickup data generated by the image pickup device; and a switch to change light transmittance of the dimming glass plate.

According to the configuration of the aspect 1 of the present invention, the shading device is capable of obstructing sunlight only when necessary without being moved and, while obstructing sunlight, displaying an image of the view obstructed by the shading device.

In the shading device for a vehicle according to an aspect 2 of the present invention, in the above aspect 1, the data processing circuit further comprises a data editing circuit to edit the image pickup data to enlarge an image based on the image pickup data in at least one direction to display an enlarged image on the display apparatus.

According to the aspect 2 of the present invention, an image easily recognized by the vehicular driver or other occupants can be displayed on the display apparatus.

In the shading device for a vehicle according to an aspect 3 of the present invention, in the above aspect 2, an image based on the image pickup data can be enlarged in a vehicle width direction and a vertical direction of the vehicle to be displayed on the display apparatus.

According to the aspect 3 of the present invention, an image easily recognized by the vehicular driver or other occupants both in the vehicle width direction and identifying the vertical direction of the vehicle can be displayed on the display apparatus.

The shading device for a vehicle according to an aspect 4 of the present invention, in the above aspect 2 or 3, can further comprise a first detector to detect position of eye of a vehicular driver, wherein the data processing circuit further comprises an angle identification circuit to identify an angle of a line of vision of the vehicular driver that is oriented to the display portion relative to the display portion based on a detection result of the first detector, the data editing circuit edits the image pickup data based on the angle of the line of vision, and the data processing circuit generates the display image data based on image pickup data edited by the data editing circuit to enlarge an image based on the image pickup data in the at least one direction based on the position of the eye to display the enlarged image on the display apparatus.

According to the aspect 4 of the present invention, an image easily recognized by the vehicular driver or other occupants can be displayed on the display apparatus in accordance with the angle between the line of vision of the vehicular driver or other occupants of the vehicle and the display apparatus.

In the shading device for a vehicle according to an aspect 5 of the present invention, in any of the above aspects 1 to 4, a display image based on the image pickup data can be automatically displayed on the display apparatus when light transmittance of the dimming glass plate falls below a given reference value.

According to the aspect 5 of the present invention, when sunlight is obstructed by the dimming glass plate 2, operations which the driver or other occupants of the vehicle is required to do to display the view of the portion obstructed by the dimming glass plate can be reduced.

In the shading device for a vehicle according to an aspect 6 of the present invention, in any of the above aspects 1 to 5, the display apparatus can be an organic EL display panel formed using a flexible film having a surface on which an organic material is laminated thereon.

According to the aspect 6 of the present invention, the visibility from the vehicular driver can be improved and the display apparatus can be easily fixed to the dimming glass plate.

In the shading device for a vehicle according to an aspect 7 of the present invention, in the above aspect 6, the organic EL display panel comprises a plurality of subpixels; each of the plurality of subpixels comprises two electrodes; the two electrodes are disposed with a given gap; and the given gap is a gap in which an optical path length of light traveling both ways between the two electrodes, reflected on at least one of the two electrodes at an angle smaller than 90° is to be a wavelength of light emitted by each of the plurality of subpixels or an integer multiple of the wavelength.

According to the aspect 7 of the present invention, intensity of light emitted in a particular direction other than the perpendicular direction relative to the display surface of the display apparatus can be increased In the shading device for a vehicle according to an aspect 8 of the present invention, in any of the above aspects 1 to 7, the dimming glass plate comprises two conductive films allowing light to pass therethrough and liquid crystal molecules sealed between the two conductive films.

According to the aspect 8 of the present invention, the light transmittance of the dimming glass plate can be easily changed by controlling the voltage applied to the dimming glass plate.

In the shading device for a vehicle according to an aspect 9 of the present invention, in the above aspect 8, at least one of the two conductive films faces the image pickup device disposed in the interior of the vehicular compartment and comprises a portion insulated from its surroundings.

According to the aspect 9 of the present invention, even when the transmittance of the dimming glass plate 2 is lowered, a view ahead of the vehicle can be captured with no difficulty through a portion having a high light transmittance.

In the shading device for a vehicle according to an aspect 10 of the present invention, in any of the above aspects 1 to 9, the dimming glass plate is provided at least at a portion of an area within the upper 20% of an image of the window glass that is projected onto a plane perpendicular to a front-back direction of the vehicle.

According to the aspect 10 of the present invention, it is possible to use a dimming glass plate having a low light transmittance.

In the shading device for a vehicle according to an aspect 11 of the present invention, in any of the above aspects 1 to 10, a driver to drive pixels of the display apparatus based on the display image data is disposed at a ceiling portion of the vehicular compartment; and a wire connecting the display apparatus and the driver is disposed to extend between the display apparatus and the ceiling portion.

According to the aspect 11 of the present invention, a voltage drop of the internal wiring lines and an amount of heat generation by conductor resistance of the internal wiring lines of the display apparatus can be decreased.

In the shading device for a vehicle according to an aspect 12 of the present invention, in the above aspect 11, the driver is disposed between an interior material provided at the ceiling portion and an exterior board forming a roof of the vehicle; the dimming glass plate is provided at a portion of or a surface of the window glass bonded at its upper edge portion to a surface of an edge portion of the exterior board, the surface of the edge portion facing outside of the vehicle; and the wire is arranged to extend from a space formed between the interior material and the exterior board, through a space between a portion of the exterior board that is bonded to the window glass and the interior material, and, to the interior of the vehicular compartment.

According to the aspect 12 of the present invention, the driver and the display apparatus can be connected with the wires having a short wiring length.

In the shading device for a vehicle according to an aspect 13 of the present invention, in any of the above aspects 1 to 12, the data processing circuit further comprises a memory circuit to store reference data related to an appearance feature of a given target; a comparison circuit to compare the image pickup data with the reference data; and a display image highlighting circuit to edit the display image data to highlight a display image of the given target to be displayed on the display apparatus more significantly than other display images.

According to the aspect 13 of the present invention, the visibility of a target with a great need to be recognized by the vehicular driver can be increased, and oversight of such a target by the vehicular driver can be reduced.

In the shading device for a vehicle according to an aspect 14 of the present invention, in any of the above aspects 1 to 13, the data processing circuit further comprises a display target data selection circuit to determine a blind spot portion obstructed by the dimming glass plate in a field of vision of a vehicular driver and select display target data among the image pickup data, the display target corresponding to the blind spot portion, and the data processing circuit generates the display image data based on the display target data so as to cause the display apparatus to display a view of the blind spot portion.

According to the aspect 14 of the present invention, an image with less unnatural feeling for the vehicular driver or other occupants can be displayed on the display apparatus even when the blind spot portion formed by the dimming glass plate with low light transmittance varies in accordance with the movement of the vehicular driver or other occupants of the vehicle.

In the shading device for a vehicle according to the aspect 15 of the present invention, in any of the above aspects 1 to 14, the image pickup device comprises a lens comprising a surface on which a coating layer to reduce reflection of light by adjusting a refractive index is formed.

According to the aspect 15 of the present invention, even when the image pickup device captures an image against sunlight, an image with reduced flare and ghosting can be displayed on the display apparatus.

The shading device for a vehicle according to an aspect 16 of the present invention, in any of the above aspects 1 to 15, further comprises a second detector to detect an intensity of incident light illuminating the dimming glass plate and a control circuit to control the switch to reduce the light transmittance of the dimming glass plate when an intensity of the incident light exceeds a preset threshold value.

According to the aspect 16 of the present invention, when sunlight is more intense than a given reference, operations of the vehicular driver that are required to obstruct the sunlight can be reduced.

In the shading device for a vehicle according to an aspect 17 of the present invention, in any of the above aspects 1 to 16, the dimming glass plate is provided over the entirety of a windshield of the vehicle in the vehicle width direction or provided at each of a portion of the windshield in front of a vehicular driver's seat and a portion of the windshield in front of a passenger's seat, with a space in between; the display apparatus is provided over the entirety in the vehicle width direction, or a second display apparatus is provided at a portion in front of the passenger's seat in addition to the display apparatus provided at a portion in front of the vehicular driver's seat; and an image displayed on a portion of the display apparatus in front of the passenger's seat or on the second display apparatus is switched between an image based on a view seen from the vehicular driver and an image based on a view seen from a passenger in the passenger's seat.

According to the aspect 17 of the present invention, it can obstruct sunlight up to a portion in front of the passenger's seat of the vehicle, and allow an image of the view obstructed by the dimming glass plate having a lowered light transmittance to be visually recognized by the vehicular driver or other occupants, and, moreover, allow a view suitable for an occupant in the passenger's seat to be visually recognized to the occupant as appropriate.

In the shading device for a vehicle according to an aspect 18 of the present invention, in the above aspect 17, an image displayed farther away from the vehicular driver's seat in a vehicle width direction of the vehicle is enlarged in the vehicle width direction at a larger enlargement ratio to be displayed on the display apparatus and/or the second display apparatus.

According to the aspect 18 of the present invention, an image easily recognized by the vehicular driver or other occupants can be displayed over the length of the vehicle in the vehicle width direction.

In the shading device for a vehicle according to an aspect 19 of the present invention, in the above aspect 17 or 18, an image based on a blind spot portion of a view seen from the vehicular driver that is obstructed by a portion of the dimming glass plate in front of the passenger's seat is displayed on a portion of the display apparatus in front of the passenger's seat or on the second display apparatus.

According to the aspect 19 of the present invention, an image with less unnatural feeling for the vehicular driver or other occupants can be displayed on the display apparatus in front of the passenger's seat.

DESCRIPTION OF REFERENCE NUMERAL 1, 11 Shading device for a vehicle
2, 12 Dimming glass plate
21a, 21b Glass plate
22 Liquid crystal sheet
22a Liquid crystal molecules
22b, 22c Conductive film
2a Surface of dimming glass plate (first surface)
2b Opposite surface of dimming glass plate (second surface)
3 Display apparatus
30 Organic EL display panel
34 Organic layer
37 Flexible film
39 Driver
39a Wire
3a Display portion
4 Image pickup device
4a Coating layer
41 Image pickup area
5 Data processing circuit
50 Data generation circuit
51 Angle identification circuit
52 Data editing circuit
53 Display target data selection circuit
53a Memory circuit
54 Memory circuit
54a, 54b Reference data
6 Switch
7 Control circuit
8 First detector
8a, 8b Eye detection camera
9 Second detector
B Blind spot portion
BA Actual blind spot portion
BR Reference blind spot portion
C Car
CG Front windshield
DR Reference display target region
DA Actual display target region
M Vehicular driver

What is claimed is:

1. A shading device for a vehicle comprising:
a dimming glass plate capable of changing a light transmittance thereof, wherein the dimming glass plate is provided at a portion of a vehicular window glass to separate an interior of a vehicular compartment from outside of the vehicular compartment or provided at a portion of a surface of the vehicular window glass that faces inside of the vehicular compartment;
a display apparatus formed of a light transmitting material and disposed at a surface of the dimming glass plate that faces inside of the vehicular compartment, with a display portion facing inside of the vehicular compartment;
an image pickup device to capture an area outside of a vehicle to generate image pickup data, wherein the area is at an opposite surface on the dimming glass plate, the opposite surface being opposite a surface on which the display apparatus is provided;
a data processing circuit to generate display image data to be displayed on the display portion, based on the image pickup data generated by the image pickup device; and
a switch to change light transmittance of the dimming glass plate; wherein
the display apparatus is an organic EL display panel;
the data processing circuit comprises a data editing circuit to edit the image pickup data to enlarge an image based on the image pickup data in at least one direction to display an enlarged image on the display apparatus; and
the data editing circuit:
selects an enlargement ratio for the image based on the image pickup data, based on an angle of a line of vision of an occupant in the vehicular compartment relative to a display surface of the display apparatus,
selects the enlargement ratio in a vertical direction of the vehicle so as to display the image based on the image pickup data with larger enlargement in the vertical direction as the angle of the line of vision relative to the display surface departs from an angle of 90 degrees, and
selects the enlargement ratio in a vehicle width direction so as to display an image displayed farther away from a vehicular driver's seat in the vehicle width direction with larger enlargement in the vehicle width direction.

2. The shading device for a vehicle according to claim 1, further comprising a first detector to detect a position of eye of a vehicular driver, wherein
the data processing circuit further comprises an angle identification circuit to identify the angle of the line of vision of the vehicular driver that is oriented to the display surface relative to the display surface based on a detection result of the first detector; and
the data editing circuit selects the enlargement ratio, based on the angle of the line of vision identified by the angle identification circuit.

3. The shading device for a vehicle according to claim 2, wherein in a situation where detection of the position of eye is temporarily impossible for the first detector, the data editing circuit selects the enlargement ratio based on the angle of the line of vision being identified based on the position of eye detected immediately before the first detector falls into the situation.

4. A shading device for a vehicle comprising:
a dimming glass plate capable of changing a light transmittance thereof, wherein the dimming glass plate is provided at a portion of a vehicular window glass to separate an interior of a vehicular compartment from outside of the vehicular compartment or provided at a portion of a surface of the vehicular window glass that faces inside of the vehicular compartment;
a display apparatus formed of a light transmitting material and disposed at a surface of the dimming glass plate that faces inside of the vehicular compartment, with a display portion facing inside of the vehicular compartment;
an image pickup device to capture an area outside of a vehicle to generate image pickup data, wherein the area is at an opposite surface on the dimming glass plate, the opposite surface being opposite a surface on which the display apparatus is provided;

a data processing circuit to generate display image data, to be displayed on the display portion based on the image pickup data generated by the image pickup device;

a switch to change light transmittance of the dimming glass plate; and a first detector to detect a position of eye of a vehicular driver; wherein the data processing circuit comprises a data editing circuit to edit the image pickup data to enlarge an image based on the image pickup data in at least one direction to display an enlarged image on the display apparatus;

the data editing circuit selects an enlargement ratio for the image based on the image pickup data, based on an angle of a line of vision of an occupant in the vehicular compartment relative to a display surface of the display apparatus, the angle being identified based on a detection result of the first detector; and in a situation where detection of the position of eye is temporarily impossible for the first detector, the data editing circuit further selects the enlargement ratio assuming that a reference position being set in advance is the position of eye, or selects the enlargement ratio based on the position of eye detected immediately before the first detector falls into the situation, according to a length of a period of time when the first detector cannot detect the position of eye.

5. The shading device for a vehicle according to claim 1, wherein the dimming glass plate is formed separately from the vehicular window glass, to be provided at the portion of the surface of the vehicular window glass that faces inside of the vehicular compartment.

6. The shading device for a vehicle according to claim 4, wherein the dimming glass plate is formed separately from the vehicular window glass, to be provided at the portion of the surface of the vehicular window glass that faces inside of the vehicular compartment.

7. A shading device for a vehicle comprising:

a dimming glass plate capable of changing a light transmittance thereof, wherein the dimming glass plate is provided at a portion of a vehicular window glass to separate an interior of a vehicular compartment from outside of the vehicular compartment or provided at a portion of a surface of the vehicular window glass that faces inside of the vehicular compartment;

an organic EL display panel formed of a light transmitting material and disposed at a surface of the dimming glass plate that faces inside of the vehicular compartment, with a display portion facing inside of the vehicular compartment;

an image pickup device to capture an area outside of a vehicle to generate image pickup data, wherein the area is at an opposite surface on the dimming glass plate, the opposite surface being opposite a surface on which the organic EL display panel is provided; and a switch to change light transmittance of the dimming glass plate; wherein the organic EL display panel displays an image based on the image pickup data;

the organic EL display panel comprises a plurality of subpixels each comprising an anode and a cathode; and the anode and the cathode are disposed with a gap therebetween, the gap having a length different from a wavelength of light emitted from each of the plurality of subpixels so as not to utilize a microcavity effect in each of the plurality of subpixels.

8. The shading device for a vehicle according to claim 7, further comprising:

a data processing circuit to generate display image data to be displayed on the display portion, based on the image pickup data generated by the image pickup device; and a first detector to detect a position of eye of a vehicular driver; wherein the data processing circuit comprises a display target data selection circuit to determine, based on at least information about the position of eye from the first detector, a blind spot portion obstructed by the dimming glass plate in a field of vision of the vehicular driver and select display target data among the image pickup data, the display target data corresponding to the blind spot portion; and the display target data selection circuit is provided with a function of cancelling shaking of a display image on the organic EL display panel caused by a motion of the vehicular driver.

9. The shading device for a vehicle according to claim 8, wherein the display target data selection circuit cancels the shaking by prolonging a period of sampling for the information from the first detector.

10. The shading device for a vehicle according to claim 8, wherein the display target data selection circuit does not newly commence a selection operation of the display target data so as to cancel the shaking, when change of the position of eye does not meet a given condition.

11. The shading device for a vehicle according to claim 8, wherein the display target data selection circuit comprises a low pass filter at an input portion to receive the information from the first detector.

12. The shading device for a vehicle according to claim 7, wherein the dimming glass plate is provided over an entirety of a windshield of the vehicle in a vehicle width direction, or provided at each of a portion of the windshield in front of a vehicular driver's seat and a portion of the windshield in front of a passenger's seat, with a space in between;

the organic EL display panel is provided over the entirety in the vehicle width direction, or a second display apparatus is provided at the portion in front of the passenger's seat in addition to the organic EL display panel provided at the portion in front of the vehicular driver's seat; and an image displayed on a portion of the organic EL display panel in front of the passenger's seat or on the second display apparatus is switched based on a state of the passenger's seat.

13. The shading device for a vehicle according to claim 12, wherein an image displayed on the portion of the organic EL display panel in front of the passenger's seat or on the second display apparatus is switched based on a state of fastening a seat belt of the passenger's seat.

* * * * *